US012800714B2

(12) United States Patent
Ma

(10) Patent No.: US 12,800,714 B2
(45) Date of Patent: Nov. 17, 2026

(54) METHODS AND SYSTEMS FOR TRANSMIT BEAM AGNOSTIC RADAR CALIBRATION

(71) Applicant: Waymo LLC, Mountain View, CA (US)

(72) Inventor: Philip Gay Ping Ma, Torrance, CA (US)

(73) Assignee: Waymo LLC, Mountain View, CA (US)

( * ) Notice: Subject to any disclaimer, the term of this patent is extended or adjusted under 35 U.S.C. 154(b) by 328 days.

(21) Appl. No.: 18/515,949

(22) Filed: Nov. 21, 2023

(65) Prior Publication Data

US 2025/0164605 A1 May 22, 2025

(51) Int. Cl.
*G01S 7/40* (2006.01)
*G01S 13/931* (2020.01)

(52) U.S. Cl.
CPC .............. *G01S 7/4008* (2013.01); *G01S 7/40* (2013.01); *G01S 13/931* (2013.01)

(58) Field of Classification Search
CPC ........ G01S 7/4008; G01S 7/40; G01S 13/931; H04B 7/0456; H04B 7/0617; H04B 7/088
(Continued)

(56) References Cited

U.S. PATENT DOCUMENTS 5,808,580 A * 9/1998 Andrews, Jr. ......... G01S 13/582 367/90
6,452,534 B1 * 9/2002 Zoratti .................. G01S 13/931 342/72

(Continued)

FOREIGN PATENT DOCUMENTS

CN 113283047 B 4/2023
JP 2011174875 A 9/2011

(Continued)

OTHER PUBLICATIONS

Pohlmann et al., "Manifold Optimization Based Beamforming for DoA and DoD Estimation with a Single Multi-Mode Antenna", Institute of Communications and Navigation, Oberpfaffenhofen, Wessling, Germany.

(Continued)

*Primary Examiner* — Nuzhat Pervin
(74) *Attorney, Agent, or Firm* — McDonnell Boehnen Hulbert & Berghoff LLP

(57) ABSTRACT

Example embodiments relate to techniques and systems for transmit beam agnostic radar calibration. A computing system can transmit each transmit antenna element of a radar to individually transmit electromagnetic energy according to a first transmit beam pattern and generate data representing a collection pattern based on reflections of the electromagnetic energy transmitted according to the first transmit beam pattern. The computing system can also synthesize, using the data representing the collection pattern, a second transmit beam pattern that differs from the first transmit beam pattern and estimate a mutual coupling matrix for processing reflections of electromagnetic energy transmitted according to the second transmit beam pattern. The computing system can then generate, by the computing system and based on the mutual coupling matrix, a model for operating the radar onboard a vehicle. The model can enable a vehicle radar system having one or more radars that match the radar to transmit and receive electromagnetic energy according to the first transmit beam pattern and the second transmit beam pattern.

20 Claims, 15 Drawing Sheets

(58) Field of Classification Search
USPC .......................................................... 342/174
See application file for complete search history.

(56) References Cited

U.S. PATENT DOCUMENTS

| | | | | |
|---|---|---|---|---|
| 8,854,255 | B1 * | 10/2014 | Ehret | G01S 13/538 342/160 |
| 9,261,879 | B2 * | 2/2016 | Ferguson | B60W 30/18154 |
| 9,409,151 | B1 * | 8/2016 | West | G01S 7/4017 |
| 9,608,709 | B1 * | 3/2017 | Kinamon | H01Q 3/2682 |
| 9,658,620 | B1 * | 5/2017 | Urmson | B60R 1/23 |
| 9,897,695 | B2 * | 2/2018 | Vacanti | G01S 7/352 |
| 10,291,335 | B1 * | 5/2019 | Wen | H04B 7/0617 |
| 10,684,354 | B2 * | 6/2020 | Brune | G01S 7/2813 |
| 10,754,018 | B2 * | 8/2020 | Slemp | H01Q 21/08 |
| 10,935,978 | B2 * | 3/2021 | Yalla | G01C 21/3407 |
| 11,255,974 | B2 * | 2/2022 | Choi | B60W 40/06 |
| 11,402,462 | B2 * | 8/2022 | Driscoll | G01S 13/424 |
| 11,506,773 | B1 * | 11/2022 | Everett | G01S 7/03 |
| 11,507,102 | B2 * | 11/2022 | Ferguson | G05D 1/0238 |
| 11,841,455 | B1 * | 12/2023 | Arool Emmanuel | G01S 7/4013 |
| 12,339,372 | B1 * | 6/2025 | Rogers | G01S 17/58 |
| 2009/0109083 | A1 * | 4/2009 | Tietjen | G01S 13/5246 342/162 |
| 2009/0201206 | A1 * | 8/2009 | Li | G01S 7/282 342/373 |
| 2010/0090887 | A1 * | 4/2010 | Cooper | H01Q 19/195 342/25 F |
| 2013/0015999 | A1 * | 1/2013 | Alland | G01S 13/931 342/70 |
| 2013/0016002 | A1 * | 1/2013 | Edwards | G01S 13/5246 342/159 |
| 2015/0084810 | A1 * | 3/2015 | Lee | G01S 13/4463 342/154 |
| 2016/0061936 | A1 * | 3/2016 | Schmalenberg | G01S 13/42 342/81 |
| 2018/0003533 | A1 * | 1/2018 | Rick | G01F 1/663 |
| 2018/0156891 | A1 * | 6/2018 | Brune | G01S 7/2813 |
| 2018/0259641 | A1 * | 9/2018 | Vacanti | G01S 13/953 |
| 2018/0267160 | A1 * | 9/2018 | Slemp | G01S 13/931 |
| 2019/0056491 | A1 * | 2/2019 | Bialer | G01S 13/931 |
| 2019/0064338 | A1 * | 2/2019 | Holt | H01Q 1/525 |
| 2019/0137601 | A1 * | 5/2019 | Driscoll | G01S 7/03 |
| 2019/0324134 | A1 * | 10/2019 | Cattle | G01S 7/024 |
| 2019/0331784 | A1 * | 10/2019 | Niesen | G01S 7/4008 |
| 2020/0096625 | A1 * | 3/2020 | Slemp | H01Q 1/3275 |
| 2020/0241109 | A1 * | 7/2020 | Shahvirdi Dizaj Yekan | G01S 13/02 |
| 2020/0309900 | A1 * | 10/2020 | Brune | H01Q 1/3233 |
| 2020/0333452 | A1 * | 10/2020 | Vacanti | G01S 13/44 |
| 2021/0026004 | A1 * | 1/2021 | Slemp | G01S 13/345 |
| 2021/0109145 | A1 * | 4/2021 | Haustein | G01R 29/0871 |
| 2021/0232147 | A1 * | 7/2021 | Refaat | G05D 1/0088 |
| 2021/0328343 | A1 * | 10/2021 | Valdes Garcia | G01R 29/10 |
| 2023/0131879 | A1 * | 4/2023 | Homma | H02J 50/40 307/104 |
| 2023/0141292 | A1 * | 5/2023 | Han | H01Q 1/3291 342/372 |
| 2023/0336205 | A1 * | 10/2023 | Lulu | G01S 13/34 |
| 2024/0410974 | A1 * | 12/2024 | Temil | G06N 5/04 |

FOREIGN PATENT DOCUMENTS

| | | | | |
|---|---|---|---|---|
| JP | 2020511678 | A * | 4/2020 | G01S 13/34 |
| JP | 2022527310 | A | 1/2022 | |
| KR | 102512895 | B1 | 3/2023 | |
| WO | WO-2019209752 | A2 * | 10/2019 | H01Q 13/206 |
| WO | 2020205369 | A1 | 10/2020 | |
| WO | 2023072713 | A1 | 5/2023 | |

OTHER PUBLICATIONS

Castellanos et al., "Electromagnetic manifold characterization of antenna arrays", IEEE, pp. 1-13 (2023).

Chen et al., "Manifold Sensitivity Analysis for MIMO Radar", IEEE Geoscience and Remote Sensing Letters, 9 (5):999-1003 (2012).

Bachmann et al., "Accurate Antenna Pattern Modeling for Phased Array Antennas inSAR Applications—Demonstration on TerraSAR-X", https://downloads.hindawi.com/journals/ijap/2009/492505.pdf (2009).

* cited by examiner

METHODS AND SYSTEMS FOR TRANSMIT BEAM AGNOSTIC RADAR CALIBRATION

BACKGROUND

Automotive radar involves using radio waves to detect the presence, distance, direction, and speed of objects in the surrounding environment of a vehicle. The vehicle radar system transmits a radio signal from a transmitter, which then bounces off nearby objects and returns to a receiver. By analyzing the characteristics of the returned signal (also referred to herein as a radar echo), the vehicle radar system can determine the location, speed, and direction of objects located in the environment, such as other vehicles, pedestrians, road boundaries, and obstacles. In some cases, radar data is used by a vehicle's advanced driver assistance systems (ADAS) or automated driving systems (ADS) to provide warnings to the driver or even take autonomous actions to avoid collisions. In other cases, a vehicle control system uses radar data when determining a control strategy for autonomous navigation by the vehicle.

Some vehicle radar systems use radar beamforming to shape and direct radar signals in a specific direction, which enables individual radars on the vehicle to focus energy on particular regions of interest. Beamforming can provide high resolution data with improved detection capabilities when compared to traditional radar systems. To perform beamforming, a radar adjusts the phase of the transmitted signals from each antenna element within an antenna array to electronically steer the direction and shape of the radar beam without requiring any physical movement of the antennas. By carefully controlling the phases and amplitudes of these signals, the radar system can use constructive and destructive interference to create the desired beam direction and shape.

SUMMARY

Example embodiments relate to techniques and systems for transmit beam agnostic radar calibration. Such techniques can be used during radar testing and calibration to decouple transmit beamforming from receive calibration in order to enable efficient processing and scaling of radars. A system can perform disclosed calibration techniques to generate a model that enables radar to transmit electromagnetic energy according to numerous beam shapes and directions during operation onboard a vehicle. In some cases, vehicle systems may perform disclosed techniques to adjust radar performance during vehicle navigation.

In one aspect, a method is described. The method involves triggering, by a computing system, each transmit antenna element of a radar to individually transmit electromagnetic energy according to a first transmit beam pattern and generating, by the computing system and based on reflections of the electromagnetic energy transmitted according to the first transmit beam pattern, data representing a collection pattern. The method also involves synthesizing, using the data representing the collection pattern, a second transmit beam pattern that differs from the first transmit beam pattern, estimating a mutual coupling matrix for processing reflections of electromagnetic energy transmitted according to the second transmit beam pattern, and generating, by the computing system and based on the mutual coupling matrix, a model for operating the radar onboard a vehicle. The model enables a vehicle radar system having one or more radars that match the radar to transmit and receive electromagnetic energy according to the first transmit beam pattern and the second transmit beam pattern.

In another aspect, a system is described. The system includes a radar and a computing system. The computing system is configured to trigger each transmit antenna element of the radar to individually transmit electromagnetic energy according to a first transmit beam pattern, generate, based on reflections of the electromagnetic energy transmitted according to the first transmit beam pattern, data representing a collection pattern, and synthesize, using the data representing the collection pattern, a second transmit beam pattern that differs from the first transmit beam pattern. The computing system is also configured to estimate a mutual coupling matrix for processing reflections of electromagnetic energy transmitted according to the second transmit beam pattern and generate, based on the mutual coupling matrix, a model for operating the radar onboard a vehicle. The model enables a vehicle radar system having one or more radars that match the radar to transmit and receive electromagnetic energy according to the first transmit beam pattern and the second transmit beam pattern.

In yet another aspect, a non-transitory computer-readable medium is described. The non-transitory computer-readable medium is configured to store instructions, that when executed by a computing system comprising one or more processors, causes the computing system to perform operations. The operations involve triggering each transmit antenna element of a radar to individually transmit electromagnetic energy according to a first transmit beam pattern, generating, based on reflections of the electromagnetic energy transmitted according to the first transmit beam pattern, data representing a collection pattern, and synthesizing, using the data representing the collection pattern, a second transmit beam pattern that differs from the first transmit beam pattern. The operations also involve estimating a mutual coupling matrix for processing reflections of electromagnetic energy transmitted according to the second transmit beam pattern and generating, based on the mutual coupling matrix, a model for operating the radar onboard a vehicle. The model enables a vehicle radar system having one or more radars that match the radar to transmit and receive electromagnetic energy according to the first transmit beam pattern and the second transmit beam pattern.

These as well as other aspects, advantages, and alternatives will become apparent to those of ordinary skill in the art by reading the following detailed description, with reference, where appropriate, to the accompanying drawings.

DETAILED DESCRIPTION

Figure 1:
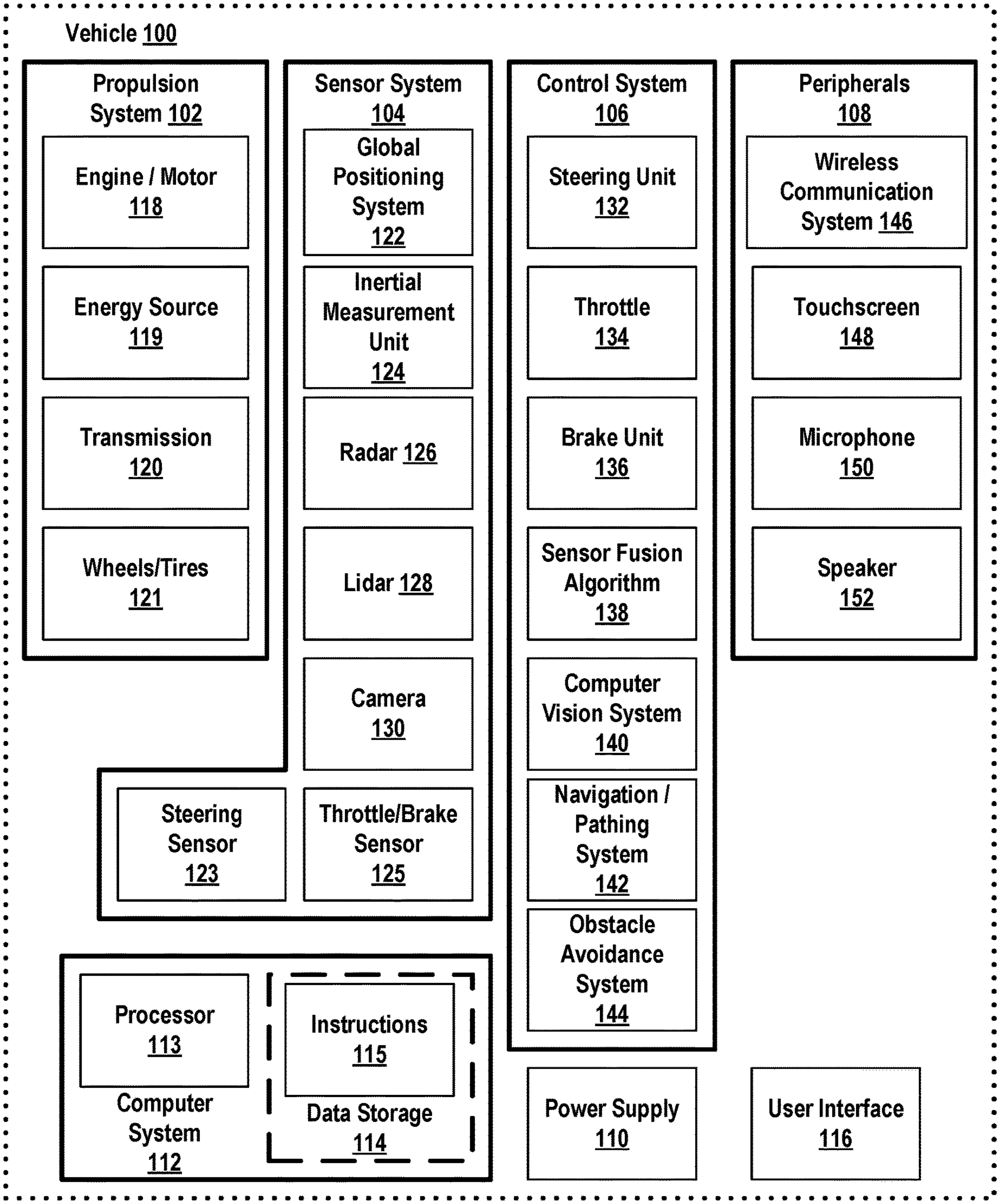
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Vehicle radar systems use beamforming due to several advantages, such as increased sensing range, higher resolution, improved object tracking, and reduced interference. Beamforming enables vehicle radars to focus transmitted energy in specific directions and extend the effective sensing range of the radar system, which allows objects, pedestrians, and vehicles to be detected at greater distances creating more time for decision-making and response by the vehicle control systems. Narrowed beams also enhance resolution enabling vehicle systems to differentiate between closely spaced objects and accurately determine their positions relative to the vehicle. Beamforming can also be used to reduce the effects of radio frequency interference (RFI) by directing radar beams toward specific target areas while enabling unwanted signals originating from outside these areas to be filtered out. As such, beamforming enables the vehicle radar system to generate cleaner and more accurate data that can assist vehicle systems safely navigate the dynamic environments encountered during navigation.

However, testing and calibrating vehicle radars for beamforming presents significant challenges, which can be due to the intricate nature of radar systems and the need for precise calibration. In some cases, beamforming performance can be negatively impacted due to variability among antenna elements in the radar array that contribute to variations in the radiation pattern and sensitivity of the individual elements. In addition, mutual coupling that arises between neighboring antenna elements in some instances can also contribute unwanted effects that impact beam pattern and calibration accuracy.

Achieving precise control over the phase and amplitude for each antenna element to enable proper beam steering and shaping can be difficult. Environmental factors (e.g., temperature variations and vibrations experienced during vehicle navigation) can also impact the physical alignment of antenna elements, which may require periodically using calibration techniques to maintain beamforming accuracy over time. In some instances, the dynamic nature of driving scenarios can require real-time adaptive calibration that increases the complexity of calibration algorithms and hardware requirements.

As such, addressing these challenges might require careful attention to manufacturing processes, calibration techniques, and reliable testing procedures to ensure that vehicle radars with beamforming capabilities provide the required level of accuracy and reliability for safe autonomous driving. Testing the different capabilities of each radar for various beam patterns can be time intensive and slow down the overall testing and calibration of radars.

Example techniques and systems presented herein relate to techniques and systems for transmit beam agnostic radar calibration, which enables the accelerated testing and calibration of radars by decoupling the transmit beamforming from receive calibration. Instead of collecting data for each transmit beam separately, disclosed techniques offer a channelized approach where various transmit beams can be synthesized individually from data collected from a channelized waveform. The channelized waveform can be generated by having each transmit antenna of a radar individually transmit electromagnetic energy at a different time for subsequent collection by a receiver and generating the channelized waveform as a result. Each transmit antenna can transmit across a range of azimuth angles and the generated data can then be used to simulate and test the performance of the radar for different beam patterns. Phase calibrations (e.g., mutual coupling matrices) and the transport delay can then be computed based on the synthesized transmit beams and used to generate a model (or multiple models) that subsequently enables the radar to transmit various transmit beam patterns. The model(s) can then be distributed as an over-the-air update for use by vehicle radar systems on various types of vehicles.

Various technologies can be used to facilitate seamless distribution of vehicle updates having one or more models to vehicles. For instance, high-speed cellular networks (e.g., LTE and 5G) can be used to distribute updates to vehicles. Wi-Fi connectivity also enables updates in environments with wireless networks, such as dealerships, businesses, and home garages. Satellite communication can be used to distribute models to remote areas, ensuring updates for vehicles in transit. In addition, short-range technologies (e.g., Bluetooth) may be used for local updates, while dedicated short-range communication (DSR) can support vehicle-to-vehicle and infrastructure communication. Mesh networks, cloud services, and software-defined networking (SDN) may contribute to versatile and dynamic approaches, which enables vehicles to access updates efficiently and securely. Updates can be distributed periodically or continuously upon availability within examples.

Disclosed techniques and systems offer several advantages over existing calibration options. In particular, example techniques eliminate the need to collect data for each individual transmit beam available to the radar and also avoid bespoke spatial support collection patterns. Rather, disclosed techniques leverage using one collection pattern that is agnostic of transmit beam lobe and null locations to replace each transmit beam. This strategy unlocks the flexibility to prepare calibrations onboard for any variation of transmit beam on demand. Such techniques can be performed during the manufacturing of radar systems. In practice, the calibration testing can occur after the radar hardware components are assembled and before the final product is shipped or deployed onto the vehicle.

In some examples, manifold matching is used to minimize the difference in computing phase calibrations with heterogeneous waveforms versus the status quo of calibrating with homogenous waveforms. In practice, equivalence between freespace and synthetic beamforming is not exact. Due to various factors (e.g., nearfield effects, radome, snapshot time, and transmit coupling), the synthesized beam can exhibit differences that make the synthesized manifold unfit for calibrating the freespace manifold. As such, manifold matching can be used to harmonize the freespace and synthetic waveforms to minimize the mismatch between the synthesized and freespace beams. As an example result, the model for operating the radar onboard the vehicle can be generated based on the information produced from the manifold matching process.

Disclosed techniques can be performed during radar manufacturing, testing, and/or calibration. For instance, individual radars can be tested using disclosed techniques and one or multiple models can be generated. The model(s) can be provided to vehicle systems via over-the-air updates or other ways (e.g., wired connection), which enables the vehicle radar systems to use the model or models for subsequent radar operations. In particular, each model may enable the radar to perform different beamforming patterns during navigation.

In some examples, the data collection process in accordance with the collection pattern is performed prior to installation of the radar at a factory. After which, the radar software can leverage the data and undergo the process of estimation calibration necessary for forming new transmit beam patterns. When the radar is fielded (e.g., positioned on a vehicle performing routes), the radar software can be augmented, such as through an over-the-air update, to form other calibrated transmit beam patterns that were not previously programmed during the factory process.

In some cases, disclosed techniques are performed onboard a vehicle. For instance, a vehicle radar system can generate new radar models or modify existing models using disclosed techniques that enable vehicle radar to transmit and receive electromagnetic energy according to different types of beams. The generation process can involve using raw measurements done with a collection pattern during radar manufacturing while other parts of the process are performed onboard during vehicle navigation, such as determination of transport delays and mutual coupling matrices. As an example result, vehicle radar systems can transmit and receive electromagnetic energy according to different transmit beam patterns.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in the navigation of vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150 (e.g., one or more interior and/or exterior microphones), and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory, computer-readable medium, such as data storage 114. As such, processor 113 can represent one or multiple processors. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

Vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment that is surrounding vehicle 200. In other words, any sensor system now known or later created could be coupled to vehicle 200 and/or could be utilized in conjunction with various operations of vehicle 200. As an example, a lidar could be utilized in self-driving or other types of navigation, planning, perception, and/or mapping operations of vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed of in various other locations on the vehicle (e.g., at location 216) and could have fields of view that correspond to internal and/or surrounding environments of vehicle 200.

The sensor system 202 may be mounted atop vehicle 200 and may include one or more sensors configured to detect information about an environment that is surrounding vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of sensor systems 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of sensor systems 202, 204, 206, 208, 210, 212, 214, and/or 218 may be configured to rotate or pivot about an axis (e.g., the z-axis) perpendicular to the given plane so as to illuminate an environment that is surrounding vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of vehicle 200. For example, one or more sensor systems 202, 204, 206, 208, 210, 212, 214, and/or 218 could include one or more radars. In some examples, one or more radars can be located near the rear of vehicle 200 (e.g., sensor systems 208 and 210), to actively scan the environment near the back of vehicle 200 for the presence of radio-reflective objects. Similarly, one or more radars can be located near the front of vehicle 200 (e.g., sensor systems 212 or 214) to actively scan the environment near the front of vehicle 200. A radar can be situated, for example, in a location suitable to illuminate a region including a forward-moving path of vehicle 200 without occlusion by other features of vehicle 200. For example, a radar can be embedded in and/or mounted in or near the front bumper, front headlights, cowl, and/or hood, etc. Furthermore, one or more additional radars can be located to actively scan the side and/or rear of vehicle 200 for the presence of radio-reflective objects, such as by including such devices in or near the rear bumper, side panels, rocker panels, and/or undercarriage, etc.

Vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. The predetermined light pattern may comprise infrared light, or radiation at other suitable wavelengths for such measurements. In some examples, the camera can be mounted inside the front windshield of vehicle 200. Specifically, the camera can be situated to capture images from a forward-looking view with respect to the orientation of vehicle 200. Other mounting locations and viewing angles of the camera can also be used, either inside or outside vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Vehicle 200 may also include one or more acoustic sensors (e.g., one or more of sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment that is surrounding vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 200 may include one or more other components in addition to or instead of those shown. The additional components may include electrical or mechanical functionality.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
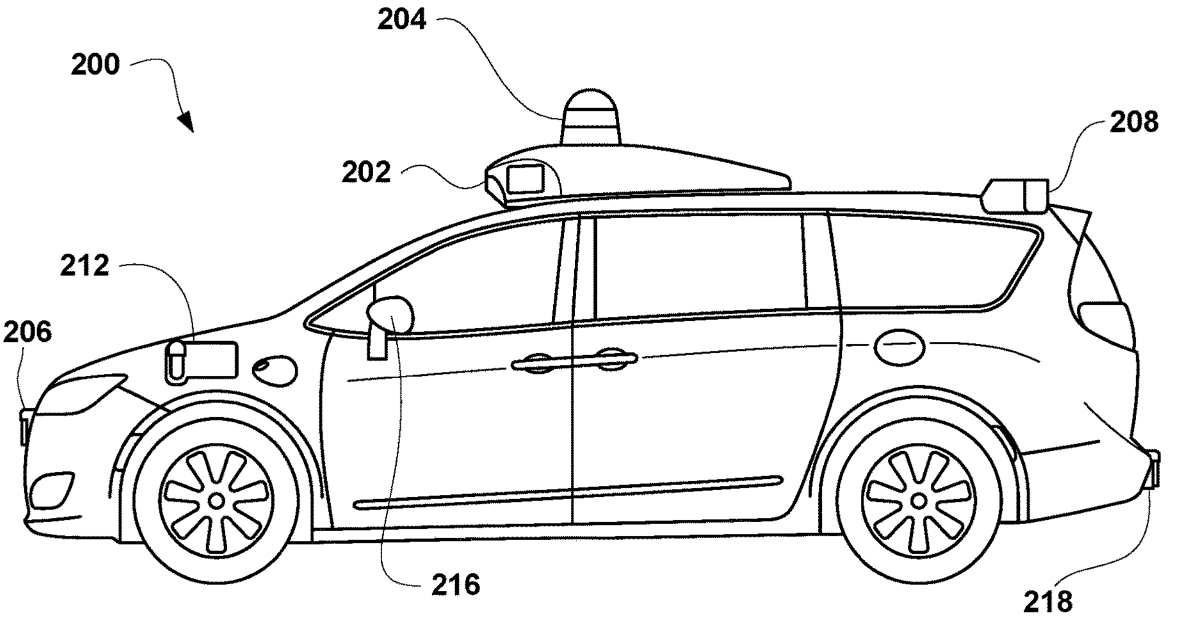
FIG. 2A is an illustration of a physical configuration of a vehicle, according to example embodiments.
Figure 2B:
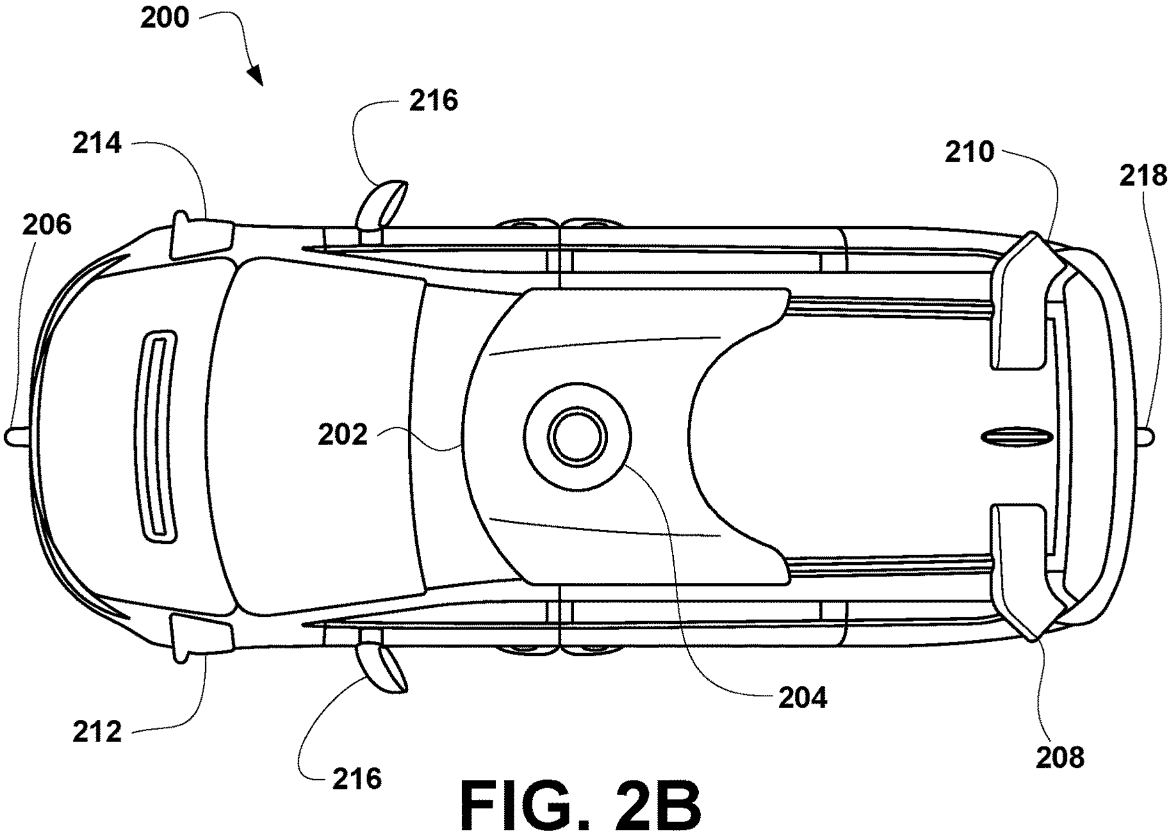
FIG. 2B is an illustration of a physical configuration of a vehicle, according to example embodiments.
Figure 2C:
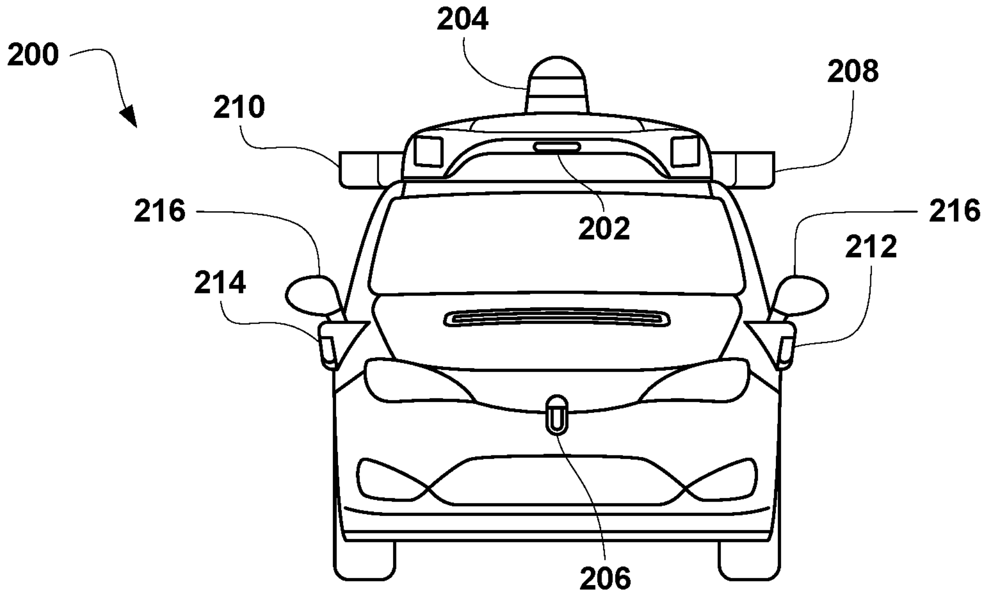
FIG. 2C is an illustration of a physical configuration of a vehicle, according to example embodiments.
Figure 2D:
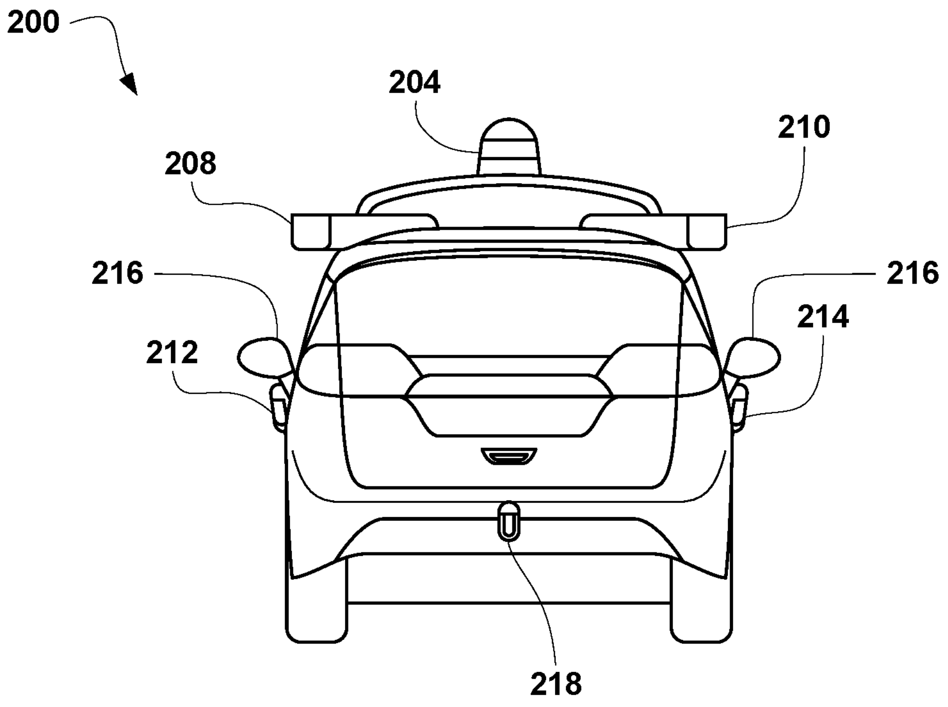
FIG. 2D is an illustration of a physical configuration of a vehicle, according to example embodiments.
Figure 2E:
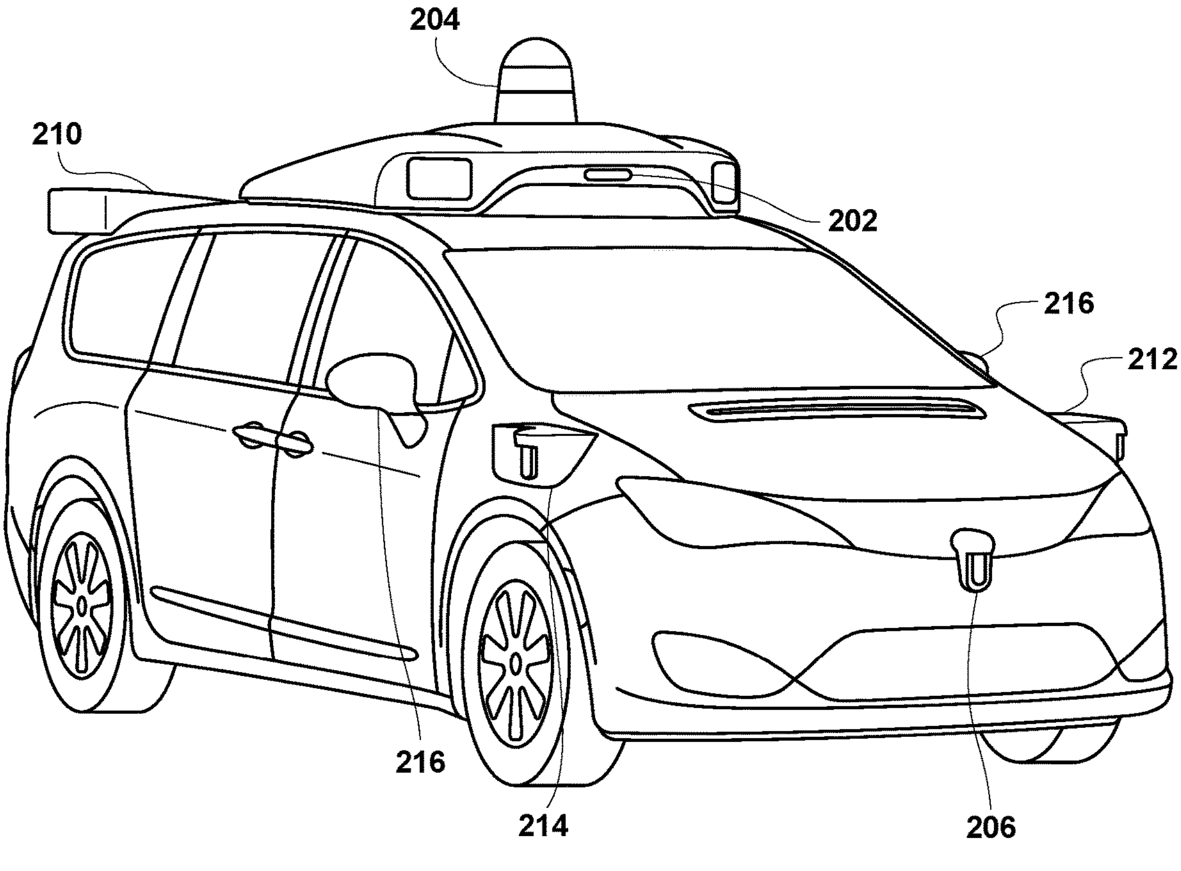
FIG. 2E is an illustration of a physical configuration of a vehicle, according to example embodiments.
Figure 2F:
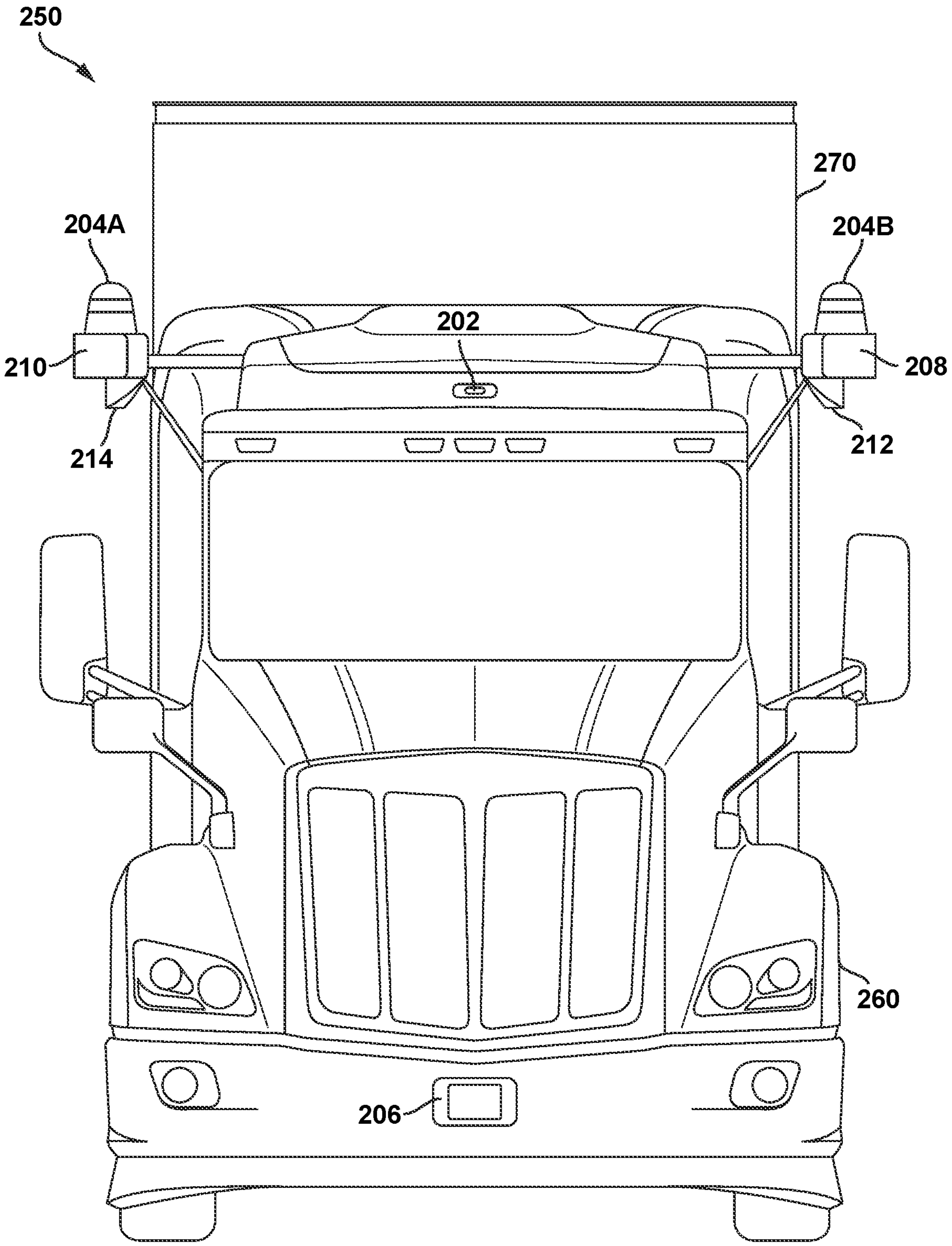
FIG. 2F is an illustration of a physical configuration of a vehicle, according to example embodiments.
Figure 2G:
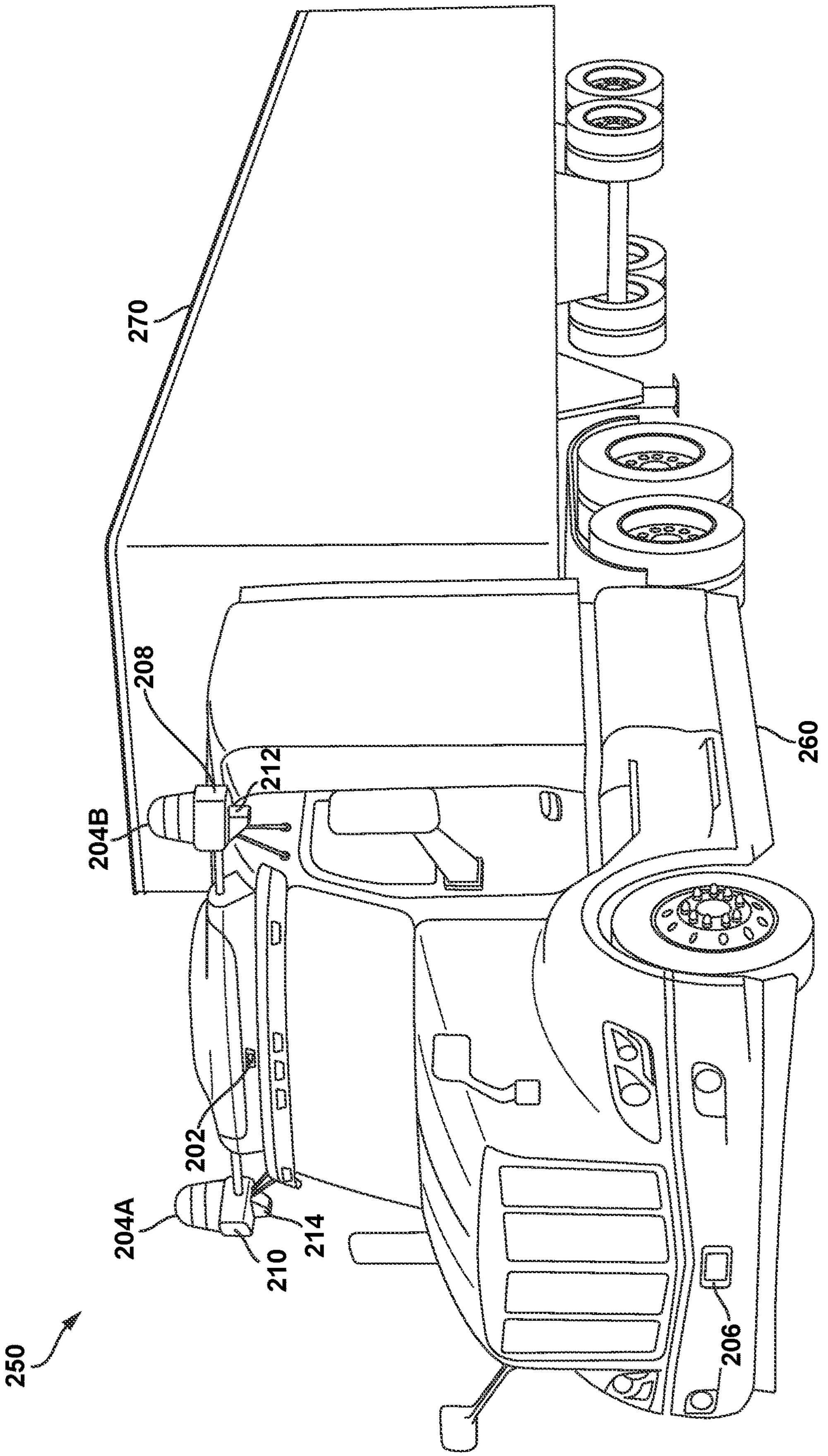
FIG. 2G is an illustration of a physical configuration of a vehicle, according to example embodiments.
Figure 2H:
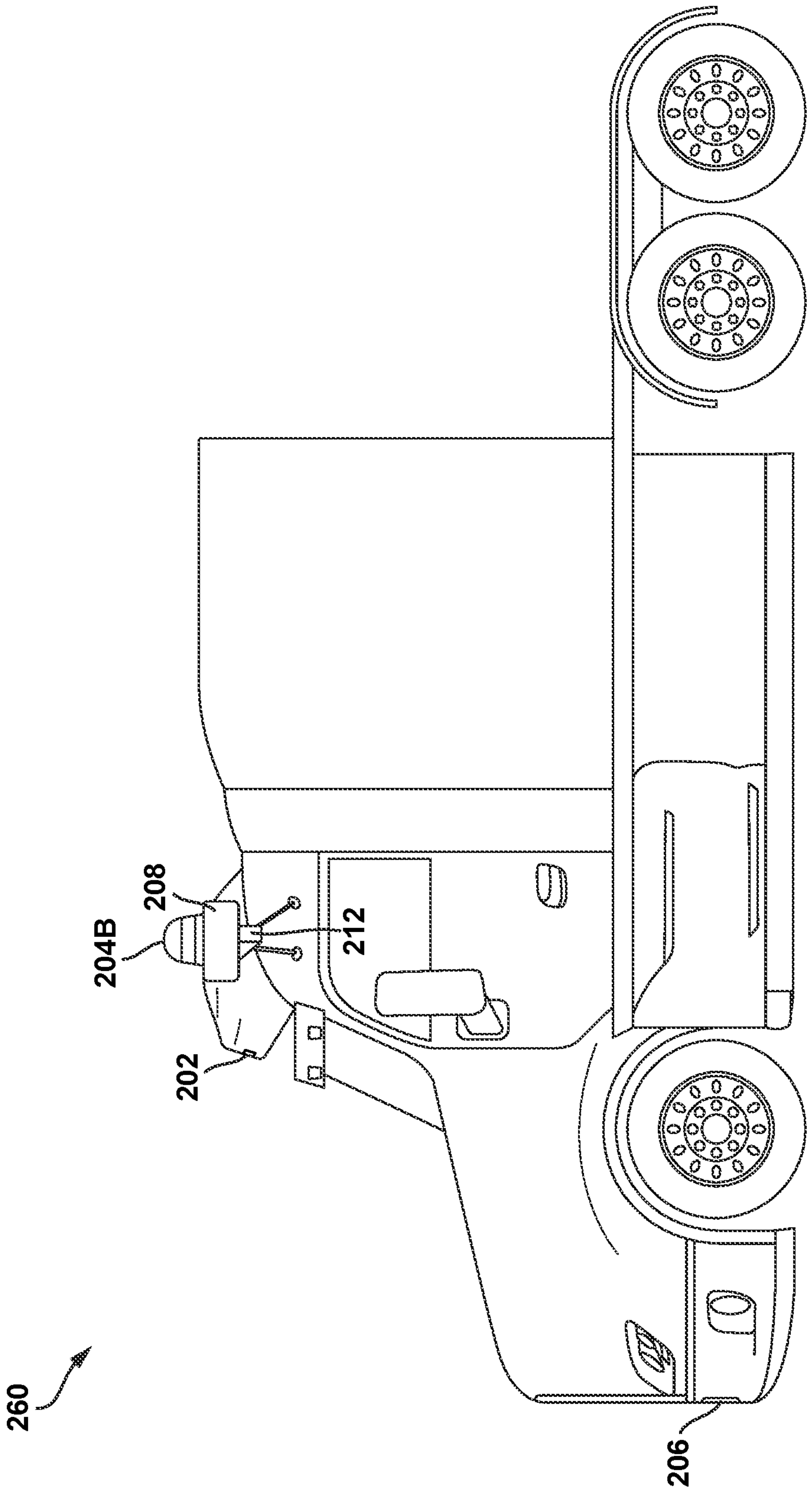
FIG. 2H is an illustration of a physical configuration of a vehicle, according to example embodiments.
Figure 2I:
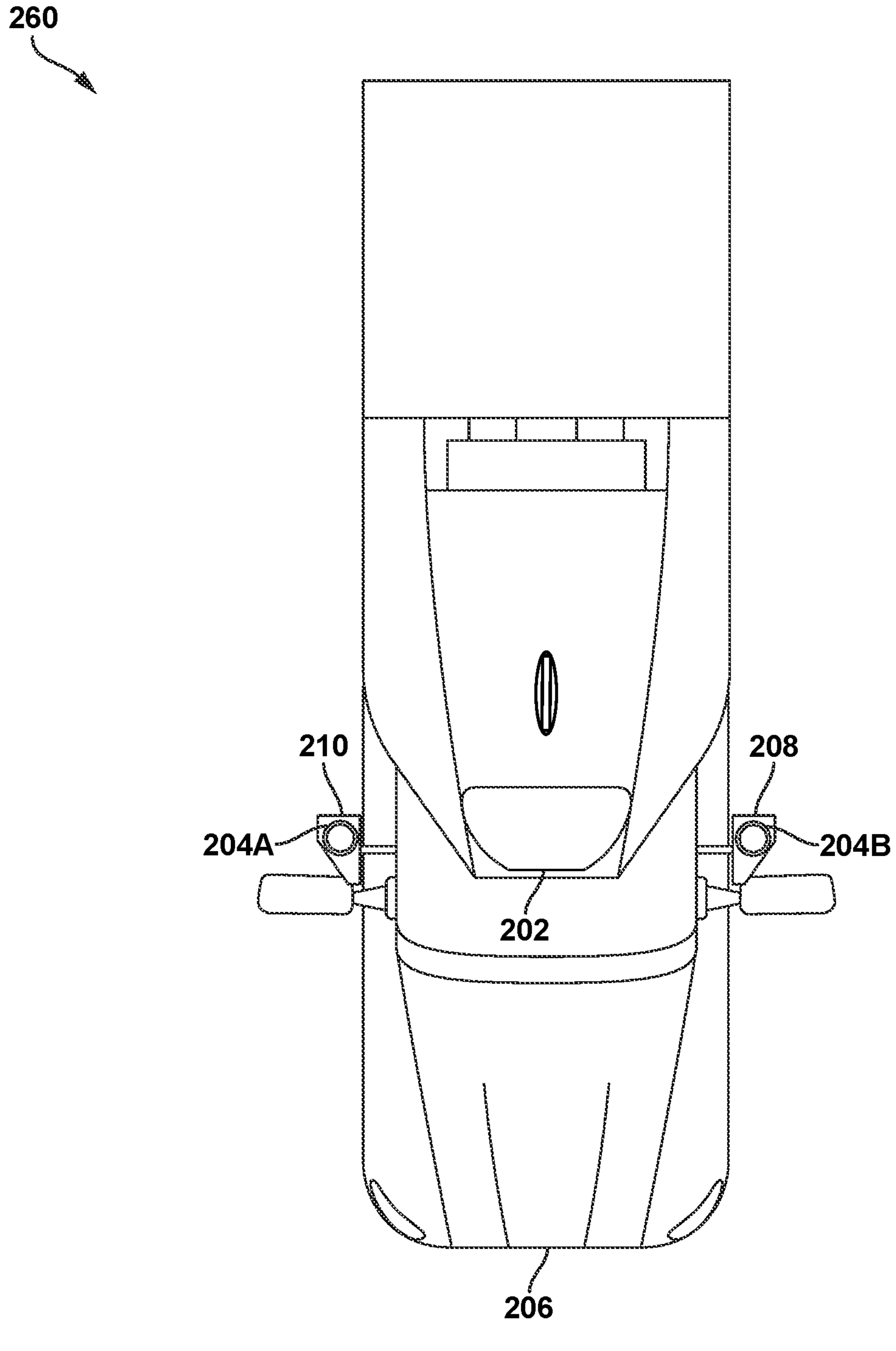
FIG. 2I is an illustration of a physical configuration of a vehicle, according to example embodiments.

As described above, in some embodiments, vehicle 200 may take the form of a van, but alternate forms are also possible and are contemplated herein. As such, FIGS. 2F-2I illustrate embodiments where vehicle 250 takes the form of a semi-truck. For example, FIG. 2F illustrates a front-view of vehicle 250 and FIG. 2G illustrates an isometric view of vehicle 250. In embodiments where vehicle 250 is a semi-truck, vehicle 250 may include tractor portion 260 and trailer portion 270 (illustrated in FIG. 2G). FIGS. 2H and 2I provide a side view and a top view, respectively, of the tractor portion 260. Similar to vehicle 200 illustrated above, vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas vehicle 200 of FIGS. 2A-2E may only include a single copy of some sensor systems (e.g., sensor system 204), vehicle 250 illustrated in FIGS. 2F-2I may include multiple copies of that sensor system (e.g., sensor systems 204A and 204B, as illustrated).

While drawings and description throughout may reference a given form of vehicle (e.g., semi-truck vehicle 250 or vehicle 200 shown as a van), it is understood that embodiments described herein can be equally applied in a variety of vehicle contexts (e.g., with modifications employed to account for a form factor of vehicle). For example, sensors and/or other components described or illustrated as being part of vehicle 200 could also be used (e.g., for navigation and/or obstacle detection and avoidance) in semi-truck vehicle 250

Figure 2J:
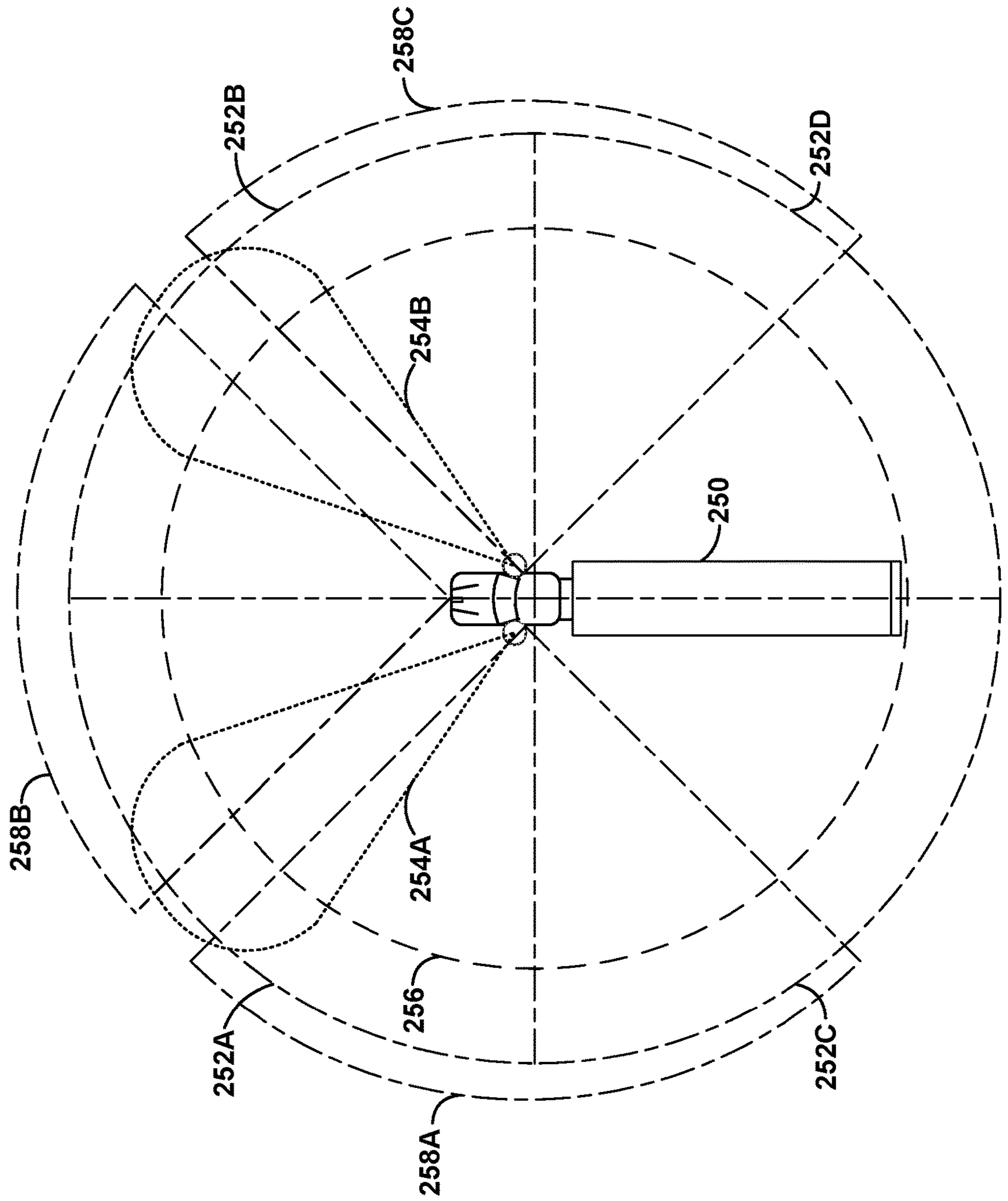
FIG. 2J is an illustration of a field of view for various sensors, according to example embodiments.

FIG. 2J illustrates various sensor fields of view (e.g., associated with vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
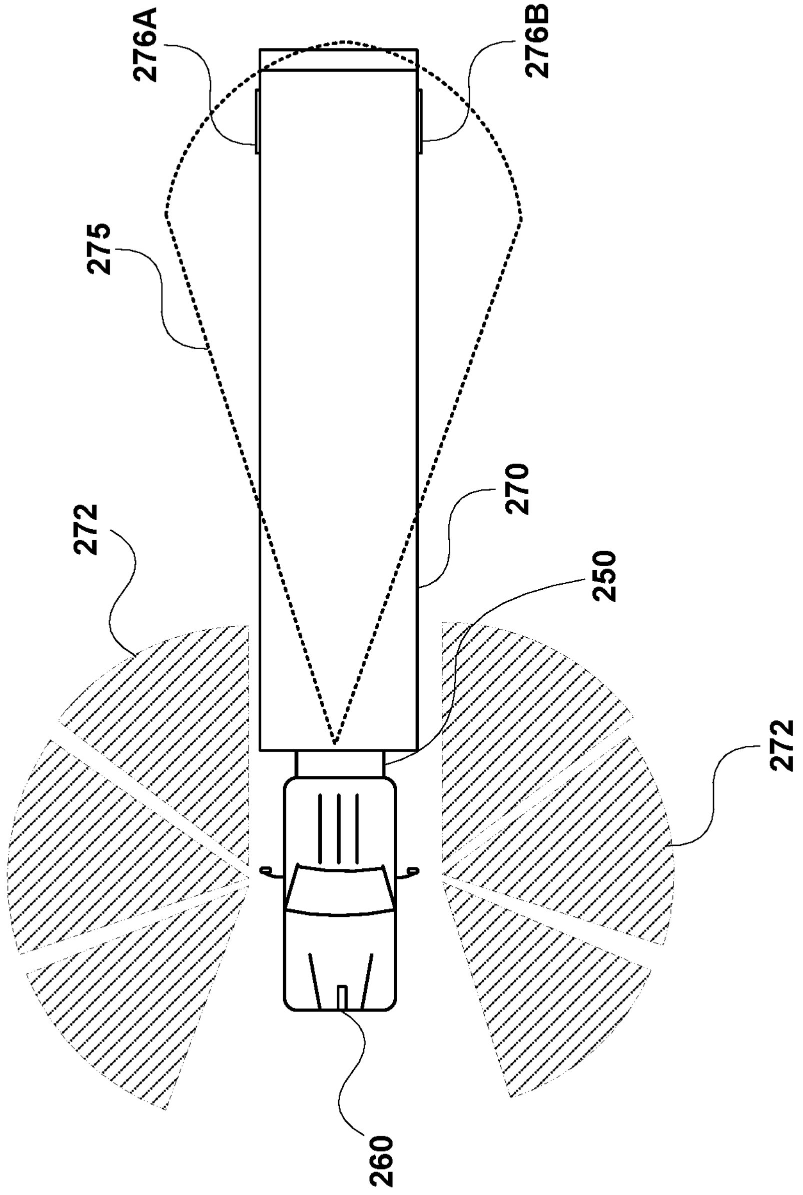
FIG. 2K is an illustration of beam steering for a sensor, according to example embodiments.

FIG. 2K illustrates beam steering for a sensor of a vehicle (e.g., vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
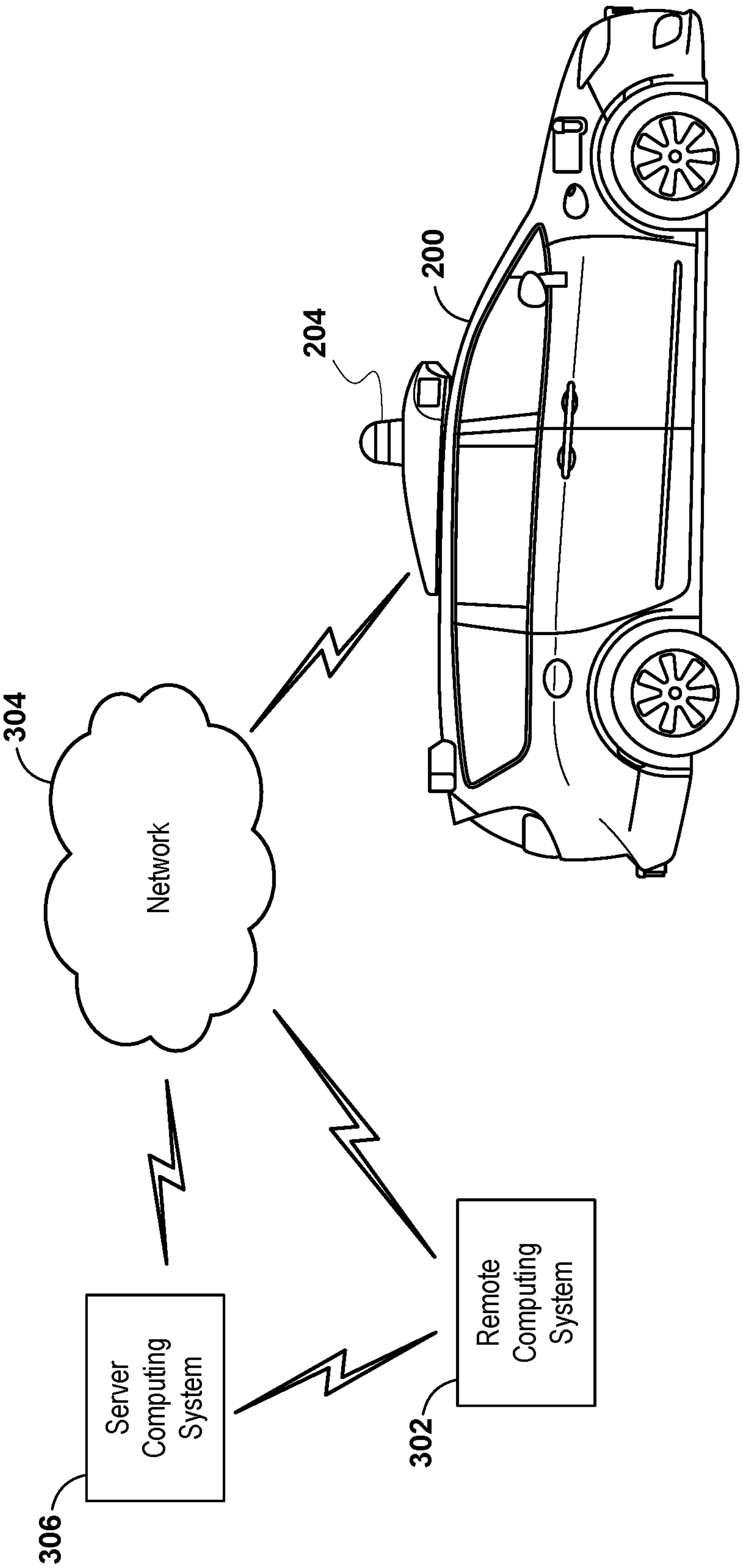
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing the velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
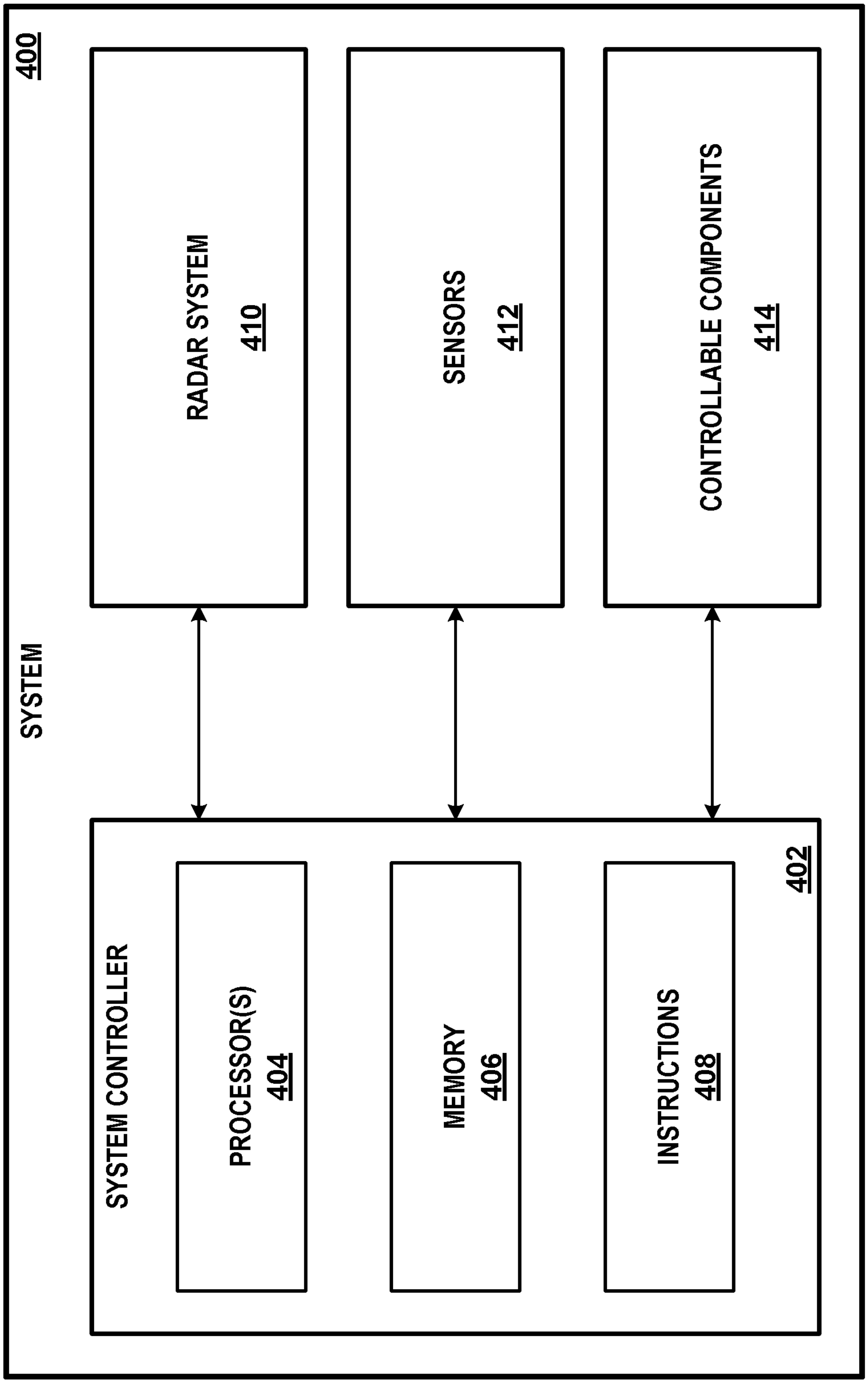
FIG. 4 is a block diagram of a system including a radar unit, according to example embodiments.

FIG. 4 is a block diagram of a system, according to example embodiments. In particular, FIG. 4 shows system 400 that includes system controller 402, radar system 410, sensors 412, and controllable components 414. System controller 402 includes processor(s) 404, memory 406, and instructions 408 stored on memory 406 and executable by processor(s) 404 to perform functions, such as the operations disclosed herein.

Processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

Memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Radar system 410 can be used in autonomous or semi-autonomous vehicles for navigation and object detection by using radio waves to detect and measure the distance, speed, and direction of objects in the surrounding environment. Radar system 410 can include one or multiple radar units, which each consists of a radar transmitter that emits radio waves and a radar receiver that captures the reflected waves from objects. By analyzing the time it takes for the waves to return and their frequency shifts (Doppler Effect), radar system 410 can determine the presence, location, and movement of objects.

In the context of autonomous or semi-autonomous vehicles, radar system 410 provides measurements that can assist with navigation and collision avoidance. Radar units are typically mounted on the vehicle's exterior, such as the front, rear, and sides. During navigation, radar system 410 may continuously emit radio waves in various directions, scanning the environment around the vehicle. When the waves encounter an object, they bounce back to a radar receiver, thereby enabling radar system 410 to analyze the reflected waves to calculate the distance, relative speed, and angle of the object. This information can be used by the vehicle's control system to make decisions and adjust the vehicle's trajectory accordingly, enabling it to detect and react to obstacles, pedestrians, vehicles, and other potential hazards in its path. By providing real-time data about the surrounding environment, radar system 410 can enhance the vehicle's perception capabilities and contribute to safer and more reliable navigation.

Radar system 410 offers operational benefits over other types of sensors in some aspects, such as cameras and lidar. Radar can perform well in adverse weather conditions, such as rain, fog, or dust, where other sensors might be limited. In particular, radio waves emitted by radar system 410 can penetrate these adverse conditions and provide reliable object detection. This makes radar particularly useful for enhancing the robustness and safety of autonomous or semi-autonomous vehicles in various weather scenarios. In addition, radar also excels at detecting the velocity and relative speed of nearby objects, which is useful for assessing the movement of surrounding vehicles, pedestrians, and other obstacles. By providing accurate speed information, radar system 410 enables the vehicle (or a driver of the vehicle) to make informed decisions about potential collision risks and adjust its behavior accordingly. In some cases, radar system 410 can also offer a longer range of measurements and broader field of view when compared to other sensors coupled to the vehicle.

Similarly, system controller 402 may use outputs from radar system 410 and sensors 412 to determine the characteristics of system 400 and/or characteristics of the surrounding environment. For example, sensors 412 may include one or more of a GPS, an IMU, an image capture device (e.g., a camera), a light sensor, a heat sensor, one or more lidar devices, and other sensors indicative of parameters relevant to system 400 and/or the surrounding environment. Radar system 410 is depicted as separate from sensors 412 for purposes of example, and may be considered as part of or as sensors 412 in some examples.

Based on characteristics of system 400 and/or the surrounding environment determined by system controller 402 based on the outputs from radar system 410 and the sensors 412, system controller 402 may control the controllable components 414 to perform one or more actions. For example, system 400 may correspond to a vehicle, in which case the controllable components 414 may include a braking system, a turning system, and/or an accelerating system of the vehicle, and system controller 402 may change aspects of these controllable components based on characteristics determined from radar system 410 and/or sensors 412 (e.g., when system controller 402 controls the vehicle in an autonomous or semi-autonomous mode). Within examples, radar system 410 and sensors 412 are also controllable by system controller 402.

Calibrating radar antenna arrays for beamforming can enable accurate and reliable radar operation. Vehicle radar systems often leverage beamforming to enable individual radars positioned on a vehicle to focus energy in a specific direction and increase accuracy for target detection and tracking. For instance, a vehicle radar system can use beamforming to have forward facing radars measure areas in front and off to the side of the vehicle.

In general, radar calibration and testing can initially involve physically aligning and positioning the antenna elements during manufacturing of the radar to ensure that the antenna elements are precisely spaced and oriented according to desired design specifications. The array elements are precisely laid out to create the desired radiation pattern during transmission by the radar. In particular, each antenna element in the array is used to transmit or receive signals with the correct phase relationship in order to achieve accurate beamforming.

Calibration of the radar involves both phase calibration and amplitude calibration. Phase calibration is performed to adjust the phase of each element's signal in order to create constructive interference in the desired direction and destructive interference in other directions during signal transmission. A computing system can use a reference signal or may measure the phase of the received signals from known targets for phase calibration. The computing system can then use advanced calibration algorithms and hardware to adjust the phase settings and ensure that the radar forms a focused beam in the intended direction. In addition to phase calibration, amplitude calibration may be performed to allow all antenna elements of the radar to contribute equally to the beamforming process. The computing system can adjust the amplitude (signal strength) of each element until uniform signal contributions across the antenna array is achieved. Without performing amplitude calibration, that radar may experience variations in amplitude during signal transmission, which can lead to uneven beam patterns that negatively impact the radar's overall performance. Once the radar antenna array is calibrated for beamforming, the radar can then be used to accurately steer beam patterns in different directions to capture precise measurements of the environment.

The calibration process on a radar can be performed during radar testing to check the performance of the radar relative to a known reference, which can be before or after the radar is installed on a vehicle. In some cases, the calibration process is performed as part of vehicle maintenance to account for any environmental factors or changes that may affect the performance of the radar over time. During calibration, various parameters of the radar system are adjusted to match the desired specification and performance standards, such as frequency, gain, phase, and sensitivity. As such, accurate calibration enables the radar to operate effectively in various applications.

Testing the different capabilities of each radar for various beam patterns, however, can be time intensive and slow down the overall installation of radars on vehicles or testing of the radars once installed on the vehicles. Therefore, disclosed techniques can decrease the amount of time required to test radars and calibrate the radars for subsequent use, such as onboard vehicles. In addition, disclosed techniques can also be subsequently performed onboard a vehicle to enable the vehicle radar system to transmit and receive electromagnetic energy according to different beamform patterns and shapes that were not originally tested for during prior calibration.

Disclosed techniques involve using a calibration processing chain that eliminates dedicated transmit calibration measurements and unified transmit and receive calibration collections. A computing system can perform the calibration processing chain to eliminate the need of bespoke spatial support collection patterns that are transmit beam-specific by using synthetic transmit beamforming. In particular, the computing system can synthesize transmit beam patterns based on a single collection pattern to reduce overall collection time and accelerate the calibration process. As such, the calibration process chain can be used to improve transmit calibration by averaging calibrations across field of views and can also involve coarsely correcting for manifold mismatches between freespace and synthesized manifolds.

Figure 5:
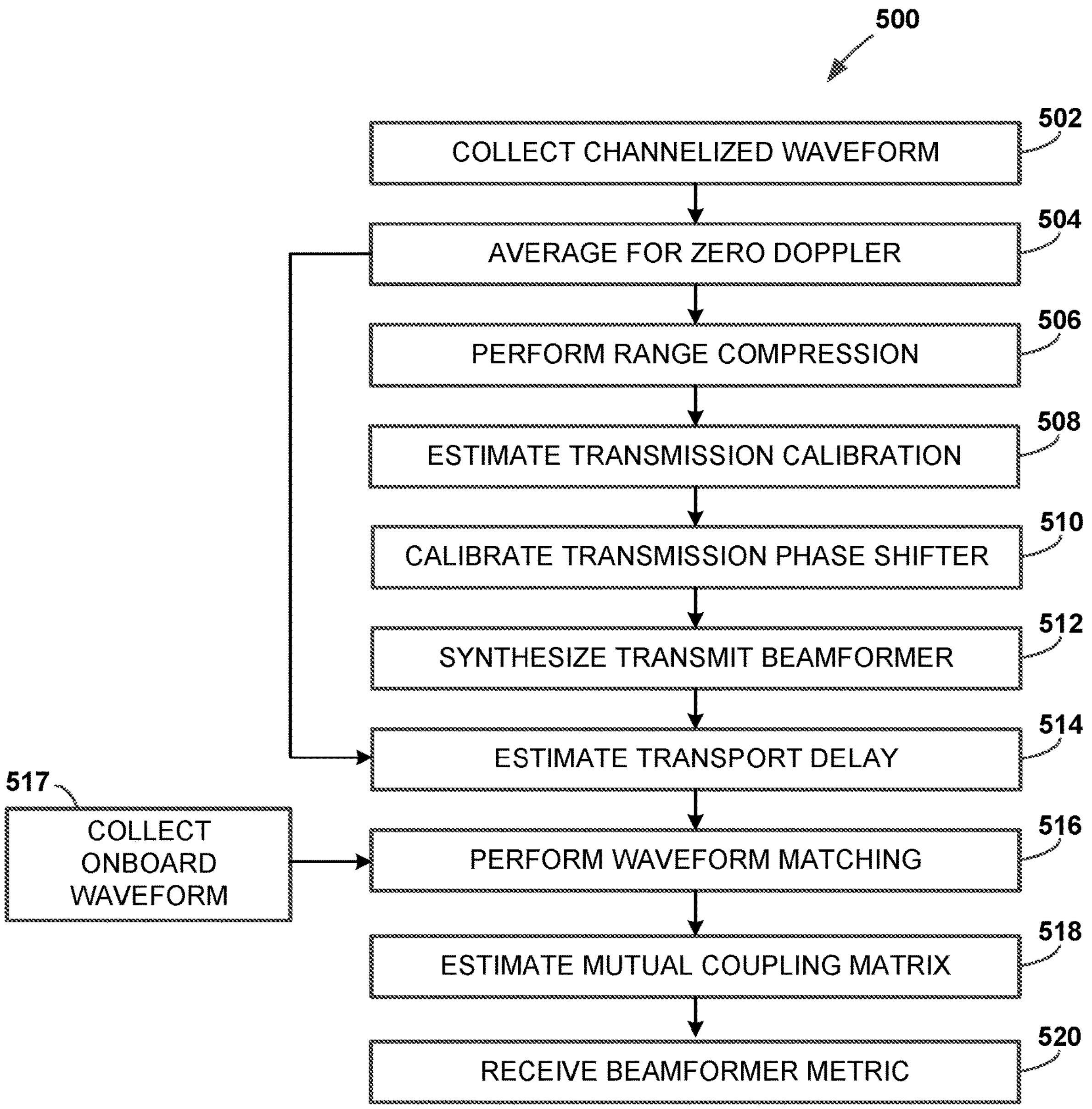
FIG. 5 is a flowchart of a method for radar calibration and testing, according to example embodiments.

FIG. 5 is a flowchart of a method for radar calibration. Method 500 may include one or more operations, functions, or actions as illustrated by one or more of blocks 502, 504, 506, 508, 510, 512, 514, 516, 517, 518, and 520. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

At block 502, method 500 involves collecting a multiplexed waveform. During a freespace beamforming event, the transmit array of a radar creates the array response by transmitting simultaneously with all transmit elements (also referred to herein as transmit antennas or antennas). This differs from the generation of a multiplexed waveform, which is also referred to herein as a channelized waveform.

In some cases, the multiplexed waveform is created by breaking up the transmit times for each element in time. The computing system can use time domain multiplexing (TDM), which involves transmitting radar pulses in discrete time intervals or slots. This allows the radar system to alternate between transmitting and receiving reflections. To generate the multiplexed waveform pattern, a system can trigger transmit elements of the radar to transmit at different times in a consecutive order. By breaking up the transmit times for each transmit element on the radar, the receive array is able to record the response separately for each transmit element thereby producing data that represents a collection pattern of a multiplexed waveform. The data representing the collection pattern can then be used for synthetic transmit beamforming.

In some examples, the transmit array of the radar can be controlled in other ways to generate the multiplexed waveform. For instance, the system can use frequency domain multiplexing (FDM), code domain multiplexing (CDM), TDM, or a combination of these techniques. For FDM, each transmit antenna element can transmit electromagnetic energy in a distinct frequency channel, which enables the receive antenna array to differentiate between the transmissions from the various transmit antenna elements. For CDM, the transmit antenna arrays can be individually controlled to each transmit electromagnetic energy according to a different code, which allows the subsequent differentiation of the reflections received by the receive antenna array of the radar.

The generated multiplexed waveform represents a collection pattern that dictates the spatial sampling grid for collecting the two-way response. To determine the collection pattern used to generate data for subsequent calibration, the cost function can be optimized across different collection patterns that can reduce the spatial peak sidelobe level. A collection pattern I(Φ) can be described by a comb function of discrete angles $\{\Phi_k\}$ as follows:

$$I_{N_{training}}(\Phi) = \sum_{n=1}^{N_{training}} \delta(\Phi - \Phi_n) \tag{1}$$

where δ is Dirac's delta function. Dirac's delta function is a mathematical concept that can be used as a tool in solving differential equations and can simplify the representation and analysis of the collection pattern.

The delta function is 1 when x=0 and 0 for all other values of x. The angles described by $I_{N_{training}}(\Phi)$ serve as the sample support in the spatial domain for the calibration estimate. The collection pattern $I_{N_{training}}(\Phi)$ is a sum of different delta functions centered at angles desirable for the measurement $\{\Phi_1, \Phi_2 \ldots \Phi_{N_{training}}\}$. As an example result, this approach enables the use of a single collection pattern rather than multiple ones that are typically required to calibrate for many transmit beams.

The computing system can generate the collection pattern by obtaining different angles for calibration measurements. In the case of freespace beamforming for multiple transmit beams, each transmit beam requires a different angle (i.e., collection pattern) to characterize the mainlobe of the transmit beam. Generating a different collection pattern for each transmit beam pattern increases costs and time required as the overall number of beams desired for subsequent use increases. When forming the transmit beams synthetically, the computing system can use the single collection pattern and minimizes the number of angles required. By using the single collection pattern, the computing system can synthesize various transmit beam patterns in less time and cost.

In some examples, the generation of the multiplexed waveform can involve transmitting the waveform in a way that differentiates the transmissions from each transmit element (e.g., TDM, FDM, CDM), receiving the reflections of the transmissions, and then processing the received data to extract information. For instance, the radar can be used to generate and transmit radar signals having known characteristics toward a calibration target, such as a pulsed waveform, a continuous-wave (CW) signal, or a frequency-modulated continuous-wave (FMCW) signal. Different channels within the signal can be assigned with specific frequency range, time, and/or modulation characteristics. The radar receive array captures the radar reflections off the calibration targets, which contain a mixture of signals from all channels. Signal processing techniques (e.g., fast Fourier transforms (FFTs) or digital filtering) can be used to separate the received signal into individual channels with each channel corresponding to a specific frequency range or function within the radar system.

At block 504, method 500 involves averaging for zero Doppler. In general, zero Doppler averaging can be used in radar testing and signal processing to improve the quality of radar data by reducing the effects of Doppler shifts, which arise when radar signals reflect off moving targets causing a change in the frequency of the reflected signal. As such, the computing system can average for zero Doppler by applying a filter that removes or minimizes the Doppler shifts.

In some examples, the computing system measures the time delay and Doppler shifts of received signals when collecting raw radar data for calibration. The raw data can include information about the range and Doppler frequency of detected targets. To average for zero Doppler, the computing system can apply a Doppler filter to the raw radar data to attenuate or eliminate the undesired Doppler frequencies. The filtered data can be averaged over multiple radar pulses or sweeps.

In general, averaging the Doppler levels can help to reduce noise and improve the signal-to-noise ratio of the radar data. Once the data has been averaged for zero Doppler, the computing system can perform further signal processing steps.

At block 506, method 500 involves performing range compression, which can improve the accuracy and precision of range measurements. During radar calibration, the computing system may analyze if the radar accurately determines the distances to a calibration target or multiple calibration targets. The computing system may use specialized waveforms, such as chirp or coded sequences, during the radar pulse transmission and reception process to perform range compression and effectively sharpen the radar's range resolution. By transmitting a modulated waveform with a known and precisely controlled pattern, the computing system can use the radar to accurately measure the time delay between the transmitted pulse and the received signal to determine the precise range to calibration targets or reflectors.

In addition, range compression can also help mitigate range ambiguities. Without compression, radar pulses may overlap making it difficult to distinguish between targets at different distances. By using range compression techniques, such as frequency modulation or coded waveforms, the radar system can resolve closely spaced calibration targets and reduce range ambiguity, which can lead to more accurate calibration results. As such, range compression can enhance the reliability and precision of range measurements during radar calibration.

At block 508, method 500 involves estimating transmit calibration parameters. The computing system can estimate transmit calibration parameters to ensure the radar operates accurately and effectively onboard a vehicle as part of a vehicle radar system.

The transmit calibration parameters can represent specific settings and characteristics that can be adjusted during the calibration process to ensure that transmitted signals achieve desired performance criteria. The transmit calibration parameters are used to maintain the accuracy and reliability of vehicle radar systems where precise target detection, tracking, and measurement are critical. As such, the transmit calibration parameters and their values can vary depending on the design, frequency band, and intended application for the radar. Some example transmit calibration parameters include transmit power, frequency bandwidth, pulse width, pulse repetition frequency, antenna and modulation characteristics, waveform shape and phase, alignment and synchronization, frequency accuracy, and signal-to-noise ratio (SNR). The computing system may calibrate the transmit parameters using a combination of hardware adjustments, software settings, and performance measurements. In some cases, one or more aspects of the calibration process for the transmit calibration parameters can be performed onboard a vehicle periodically to maintain the radar's accuracy and ensure compliance with operational requirements.

At block 510, method 500 involves calibrating the transmit phase shifter, which can involve adjusting and aligning the phase shifters in the transmit chain of the radar to ensure that the radar system can accurately and precisely control the phase of transmitted signals.

Phase shifters are used in radar antenna arrays to steer the radar beam electronically. By adjusting the phase of the signals sent to different antenna elements, the radar can control the direction in which the radar beam is focused. The computing system can perform transmit phase shifter calibration by precisely setting the phase delays for each antenna element in order to achieve the desired beamforming characteristics. This enables the transmitted energy to be concentrated in a specific direction improving target detection and tracking capabilities.

In practice, electronic components like phase shifters may have slight variations in their performance due to manufacturing tolerances, temperature changes, or aging. The computing system can factor these variations and ensure that all phase shifters in the radar system are operating consistently in order to compensate for any hardware discrepancies and maintain beamforming accuracy.

At block 512, method 500 involves synthesizing a transmit beamformer. Synthesizing radar signals refers to the process of generating or creating radar waveforms, which can then be used to generate a model for use by vehicle radar systems. The waveform of the transmitted radar signal determines various characteristics of the radar signal, including its frequency, modulation, pulse width, amplitude, and phase. By synthesizing radar signals, custom waveforms can be created with specific parameters to simulate various radar scenarios or test radar systems under controlled conditions. For instance, the single collection pattern can be used to synthesize transmit beam patterns with different shapes and directions.

In some cases, the computing system can use the synthesized radar signals to test the performance of the radar. By generating controlled radar signals, testers can evaluate how a radar system responds to different scenarios, such as the detection of different types of targets, interference, jamming, or environmental conditions. This helps in assessing the radar's capabilities and identifying potential issues or improvements.

At block 514, method 500 involves estimating a transport delay, which represents the time delay introduced into the radar signal path as electromagnetic energy travels from the radar's transmitter to the antenna elements or from the antenna elements to the radar's receiver. The transport delay can occur due to the physical separation between the transmitter and receiver components of the radar system.

In radars that use phase arrays for beamforming, the transport delay arises due to each antenna element being physically spaced apart from the others. When transmitting signals, the radar factors the differences in propagation time from the transmitter to each antenna element, which enables the radar to have transmitted signals arrive at the same time at the target region to form a coherent radar beam. Similarly, during signal reception, the radar compensates for the transport delays in order to align the signals received from different antenna elements. The alignment enables coherent signal processing and accurate beamforming. Thus, to optimally perform beamforming and calibration, the radar system may use accurate measurements of transport delays to be able to properly align and synchronize transmitted and received signals. Calibration algorithms can factor the distances between the antenna elements to adjust the phases and time delays of the signals and thereby enable precise beam steering and shaping for optimal radar performance.

At block 516, method 500 involves performing waveform matching, also referred to herein as manifold matching. In general, waveform matching involves comparing the transmitted or received radar waveform generated by the radar with an expected or reference waveform. The comparison enables the computing system to assess the performance and accuracy of the radar system. As shown, block 517 of method 500 involves collecting onboard waveforms, which can be used as part of the waveform matching process.

The reference waveform used for waveforming matching can be a predefined or ideal radar signal that represents how the radar is expected to transmit or receive. In some cases, the reference waveform is generated for specific operating conditions, such as the calibration environment of the radar. As such, the computing system or another computing device may generate the reference waveform based on the radar's design specifications and the intended use case. The reference waveform can include information about the waveform's frequency, pulse width, modulation, amplitude, and other relevant parameters.

The computing system can use waveform matching to evaluate the received radar reflections to the reference signal. The received radar reflections can differ due to environment conditions, hardware imperfections, and other factors. The computing system uses the comparison to determine how closely the radar's performance matches the expected behavior. Key aspects of the comparison may include checking for deviations in signal frequency, phase, amplitude, and timing.

The computing system can use the results of the waveform comparison to assess the radar's performance. When the actual radar signal closely matches the reference waveform, the results of the comparison show that the radar is operating as expected and is likely to perform well in its intended tasks. When the comparison shows deviations between the actual radar signal and the reference waveform, this may indicate issues with the radar, such as calibration errors or hardware faults. If discrepancies between the actual and reference waveforms are detected during testing, the computing system can use the information from the waveform matching process to identify and address the difference. Waveform matching can be used for validating and verifying radars to ensure that each radar can reliably and accurately detect and track targets.

The computing system may perform manifold matching after the transmit beams are synthesized and before estimating the mutual coupling matrix. For each transmit beam synthesized by the computing system based on the collection pattern, the computing system can model the freespace array response at the mainlobe of the transmit beam. This model can either be based on collected data, ray tracing techniques, numerical electromagnetic code (NEC), or other ways. The model can be used to roughly characterize the freespace response near the mainlobe of the transmit beam pattern that is to be synthesized.

The computing system can then calculate the average complex multiplier between the synthesized and freespace array responses and fold the difference back into the synthesized array response across its collection pattern. The computing system can use a least square technique or a simple inversion to calculate the complex correction. As an example result, the synthesized collection pattern imitates its freespace counterpart and can provide a mutual coupling matrix estimate that is well-matched to an estimate baked on "natural" freespace manifold.

At block 518, method 500 involves estimating a mutual coupling matrix. The mutual coupling matrix (also known as the mutual coupling matrix or mutual coupling coefficient matrix) is a mathematical representation that describes the electromagnetic coupling or interaction between the individual antenna elements in an antenna array. This matrix characterizes how the presence of one antenna element affects the radiation pattern and performance of the others within the array. The computing system can use an understanding of the mutual coupling to enable the accurate calibration of radar antenna arrays.

Radar systems often use antenna arrays consisting of multiple individual antenna elements. These arrays can be linear, planar, or three-dimensional and are designed to work together to transmit and receive radar signals, control beamforming, and improve overall system performance. When antenna elements are in close proximity to each other within an array, the antenna elements can influence the performance of other antenna elements in the array due to electromagnetic coupling effects, which can cause variations in the antenna's radiation pattern, impedance, and other characteristics.

The mutual coupling matrix can differ for different angles. When a radar transmits or receives electromagnetic waves, the waves can interact with nearby antennas based on various factors, such as the angle at which the incoming or outgoing waves are incident. In particular, different angles can result in different spatial relationships between the antennas, which can lead to variations in mutual coupling. Because the radar uses constructive and destructive interference to steer the radar beam in a specific direction, the mutual coupling matrix can be used to determine the phase relationships between the antenna elements to achieve the desired beamforming. As such, the computing system can estimate the mutual coupling matrix for the radar to compensate for mutual coupling effects and ensure accurate target detection and tracking at various angles. In some examples, the mutual coupling matrix is a square matrix in which each element represents the coupling coefficient between a pair of antenna elements within the array. The matrix is typically symmetric because the coupling effect is reciprocal (i.e., the effect of antenna "A" on antenna "B" is the same as the effect of antenna "B" on antenna "A").

The mutual coupling matrix is used to account for these interactions during beamforming calculations, ensuring that the radar beam is accurately formed and directed. The computing system analyzes the mutual coupling to compensate for the effects of coupling in radar antenna arrays and leverages calibration techniques to adjust the phases and amplitudes of signals sent to each element to mitigate the impact of coupling, which allows the radar to maintain accurate beamforming and target detection.

At block 520, method 500 involves determining receive beamformer metrics, which represent objective measurements that can be used to evaluate the performance of a receiver beamforming system. The receiver beamformer metrics can provide quantifiable indicators of how effectively the radar is functioning.

In some examples, the receive beamformer metrics can encompass various aspects of beamformer performance, such as beamwidth, sidelobe level, beam steering accuracy, and sensitivity. In general, beamwidth measures the angular width of the mainlobe of the beamforming pattern, which influences angular resolution. The sidelobe levels quantify the strength of radiation in directions other than the main beam and can affect interference rejection. Beam steering accuracy represents the precision of directing the beam toward desired targets or sources and sensitivity gauges the radar system's ability to detect weak signals.

In addition, other metrics, such as directivity, SNR, and dynamic range, can be used to assess aspects related to signal strength and noise resilience. The computing system may use the beamformer metrics to provide a comprehensive view of the radar's ability to enhance signal reception and reduce interference. In some cases, the system can use the receive beamformer for system optimization and performance evaluation.

Figure 6:
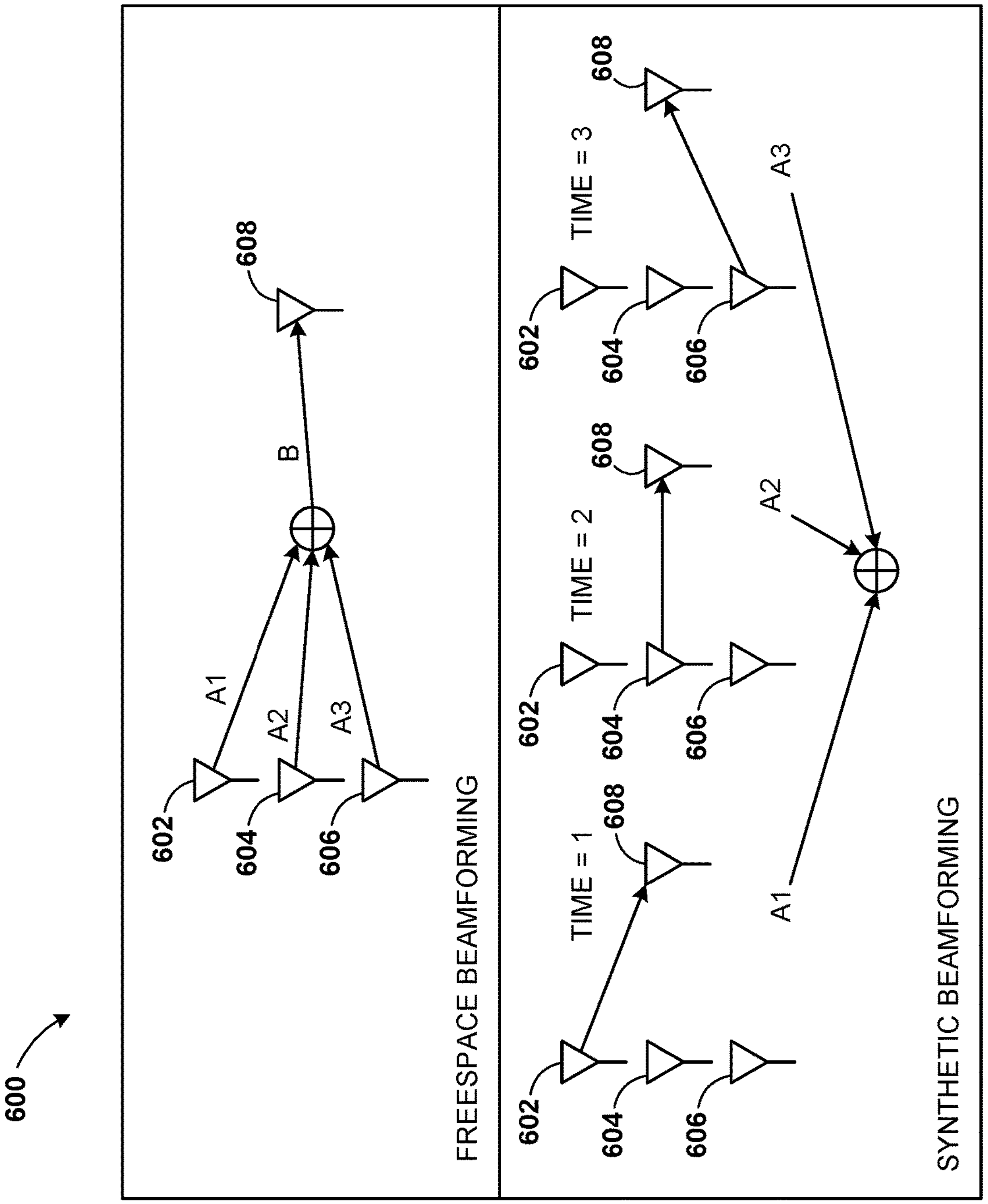
FIG. 6 is a conceptual illustration of generating radar data representing a collection pattern for calibration, according to example embodiments.

FIG. 6 is a conceptual illustration of radar data generation and analysis, which shows a comparison between freespace beamforming and synthetic beamforming. Freespace beamforming is represented with transmit antenna 602, transmit antenna 604, and transmit antenna 606 all shown transmitting electromagnetic energy at the same time to form the freespace beam that is received by receive antenna 608. Conversely, synthetic beamforming is represented by having each transmit antenna 602-606 transmit electromagnetic energy individually based on variations within a domain. In the example shown in FIG. 6, transmit antennas 602-606 are shown each transmitting at a different time (TDM), which causes receive antenna 608 to receive reflections from each transmit antenna 602-606 at a different time. In other examples, different frequencies or codes can be used to differentiate between the transmissions of transmit antennas 602-606.

In the example embodiment, time is used to distinguish between the transmissions of transmit antenna 602-606 for synthetic beamforming. In particular, transmit antenna 602 is shown transmitting a signal at time 1, transmit antenna 604 is shown transmitting a signal at time 2, and transmit antenna 606 is shown transmitting a signal at time 3. Time 1 is before time 2, which is before time 3. The variance between the different times can vary within examples. For instance, time 2 can occur at 5 milliseconds after time 1 and time 3 can occur at 5 milliseconds after time 2. The differences between the times can vary within examples.

As shown in FIG. 6, receive antenna 608 is shown receiving electromagnetic energy formed based on the freespace transmit beam pattern and the synthetic transmit beam pattern. For synthetic beamforming, however, receive antenna 608 is shown receiving the transmitted signals at different times, which is due to transmit antennas 602-606 transmitting individually at different times. In some examples, each transmit antenna 602-606 transmit signals across different angles for receipt by receive antenna 608. Transmit antennas 602-606 can transmit according to a particular collection pattern that is agnostic of lobe and null locations of the synthesized transmit beams. For freespace transmit beams, this can require a separate collection pattern to mitigate lobe and null locations.

To further describe freespace beamforming and synthetic beamforming, equation 2 is provided below to represent desired transmit weights ($w_\Phi$) that can be used by transmit antennas 602-606 while equation 3 is provided to represent transmit calibration phase offsets (t) and transmit steering vector a(ϕ) is represented by equation 4.

$$w_\Phi = [\, w_{\Phi,1} \;\; w_{\Phi,2} \;\; \ldots \;\; w_{\Phi,M} \,]^T \tag{2}$$

$$t = \left[\, e^{j\Delta\Psi_1} \;\; e^{j\Delta\Psi_2} \;\; \ldots \;\; e^{j\Delta\Psi_{N_{TX}}} \,\right]^T \tag{3}$$

$$a(\phi) = \left[\, e^{j2\pi f_0 \tau_1(\phi)} \;\; e^{j2\pi f_0 \tau_2(\phi)} \;\; \ldots \;\; e^{j2\pi f_0 \tau_{N_{TX}}(\phi)} \,\right]^T \tag{4}$$

Transmit signal pulse at time (n) "x(n)" is represented in equation 5, receive steering vector toward direction ϕ can be represented in equation 6, and receive calibration terms can be represented by equation 7.

$$x(n) = [\, x_1(n) \;\; x_2(n) \;\; \ldots \;\; x_{N_{TX}}(n) \,]^T \tag{5}$$

$$b(\phi) = \left[\, e^{j2\pi f_0 \tau'_1(\phi)} \;\; e^{j2\pi f_0 \tau'_2(\phi)} \;\; \ldots \;\; e^{j2\pi f_0 \tau'_{N_{TX}}(\phi)} \,\right]^T \tag{6}$$

$$\Gamma(\phi) = [\, R_1(\phi) \;\; R_2(\phi) \;\; \ldots \;\; R_{N_{TX}}(\phi) \,]^T \tag{7}$$

Where $R_q(\phi)=\Sigma_{q' \in Q_q} A_q e^{j\Gamma_{q'}}$

In general, the concepts of array response and array manifold can be used synonymously to describe an antenna array's wave field sampling in space. For a conventional transmit phased array with isotropic elements, the desired 1-way transmit response at direction at time (n) can be described as follows:

$$s(\phi, n) = (w_\Phi \odot a(\phi))^H x(n) \quad (8)$$

where $\odot$ is the Hadamard product (per element multiplication). As an example, the weighting function for a transmit beam pointing in the direction $\Phi$ with uniform tape can be represented as:

$$w_\Phi = \left[ e^{j\frac{2\pi}{\lambda}dsin\Phi} \quad e^{j\frac{2\pi}{\lambda}2dsin\Phi} \quad \ldots \quad e^{j\frac{2\pi}{\lambda}N_{TX}dsin\Phi} \right]^H \quad (9)$$

In the far field, the composite transmit weighting function then becomes:

$$w_\Phi \odot a(\phi) = \left[ e^{j\frac{2\pi}{\lambda}d(sin\phi - sin\Phi)} \quad e^{j\frac{2\pi}{\lambda}2d(sin\phi - sin\Phi)} \quad \ldots \quad e^{j\frac{2\pi}{\lambda}N_{TX}d(sin\phi - sin\Phi)} \right]^T \quad (10)$$

Assuming isotropic transmit elements for a linear array, the weighting function above describes the transmit array manifold. Ignoring range loss, the 2-way array responses across the receive array for an isotropic reflector can be described by the following vector:

$$s_{RX}(\phi, n) = (\Gamma(\phi) \odot b(\phi))(w_\Phi \odot a(\phi))^H x(n) \quad (11)$$

Let the pulse train x(n) be identical pulses across pulse indices, which enables the dependence on n to be removed from x. The freespace response then becomes:

$$s_{RX}(\phi) = (\Gamma(\phi) \odot b(\phi))(w_\Phi \odot a(\phi))^H x \quad (12)$$

Equation 12 can be used to represent the response received by receive antenna 608, which is a freespace transmit beam pattern. Conceptually similar to Synthetic Aperture Radar (SAR), the freespace transmit beam can be synthesized by a computing system using 2-way responses from individual transmit elements. Let the mapping $I_p$: $C^{N_{TX}} \rightarrow C^{N_{TX}}$ be defined as follows:

$$I_p(v) = [0 \;\; 0 \;\; \ldots v_p \;\; \ldots 0]^T \quad (13)$$

This mapping symbolizes the activation of only transmit element p in the array, while turning off all other elements as shown in FIG. 6. By activating each transmit element 602-606 individually, the following receive array response vector for the $p^{th}$ pulse as follows:

$$\hat{s}_{RX}(\phi, p) = (\Gamma_p(\phi) \odot b(\phi))(I_p\{a(\phi)\})^H x \quad (14)$$

where p=1, 2, . . . , $N_{TX}$.

The synthesized transmit beam form response on receive becomes:

$$s'_{RX}(\phi) = \gamma(\phi) \sum_p w^*_{\Phi,p} \hat{s}_{RX}(\phi, p) \quad (15)$$

Thus, equations 14 and 15 can represent the synthetic beam pattern formed by a computing system using disclosed techniques. For superposition, it can be claimed that:

$$s_{RX}(\phi) \approx s'_{RX}(\phi) \quad (16)$$

In practice, however, the receive calibration factors in the synthesized response ($\Gamma_p(\phi)$) is different from the freespace response ($\Gamma(\phi)$). This can be due to various factors, such as near field interaction between the antenna elements and the radome and/or different coupling interactions due to different transmit beams.

To account for this discrepancy between the freespace ($s_{RX}(\phi)$) and synthesized ($s'_{RX}(\phi)$) array manifold, the computing system can estimate an angle dependent term $\gamma(\phi)$ that can be used to coarsely correct between the two by performing manifold matching. The angle dependent term $\gamma(\phi)$ can be estimated from both ($s_{RX}(\phi)$) and ($s'_{RX}(\phi)$) array at sparse points in space and sampled at the transmit steering directions of $\phi$. This step manifold matches between the freespace and the synthesized array responses. Given that $w_\Phi$ governs the transmit array response, the flexible and retroactive generation of receive array response for different $w_\Phi$ is enabled by synthesizing $s'_{RX}(\phi)$ using consecutive transmit elements.

Figure 7:
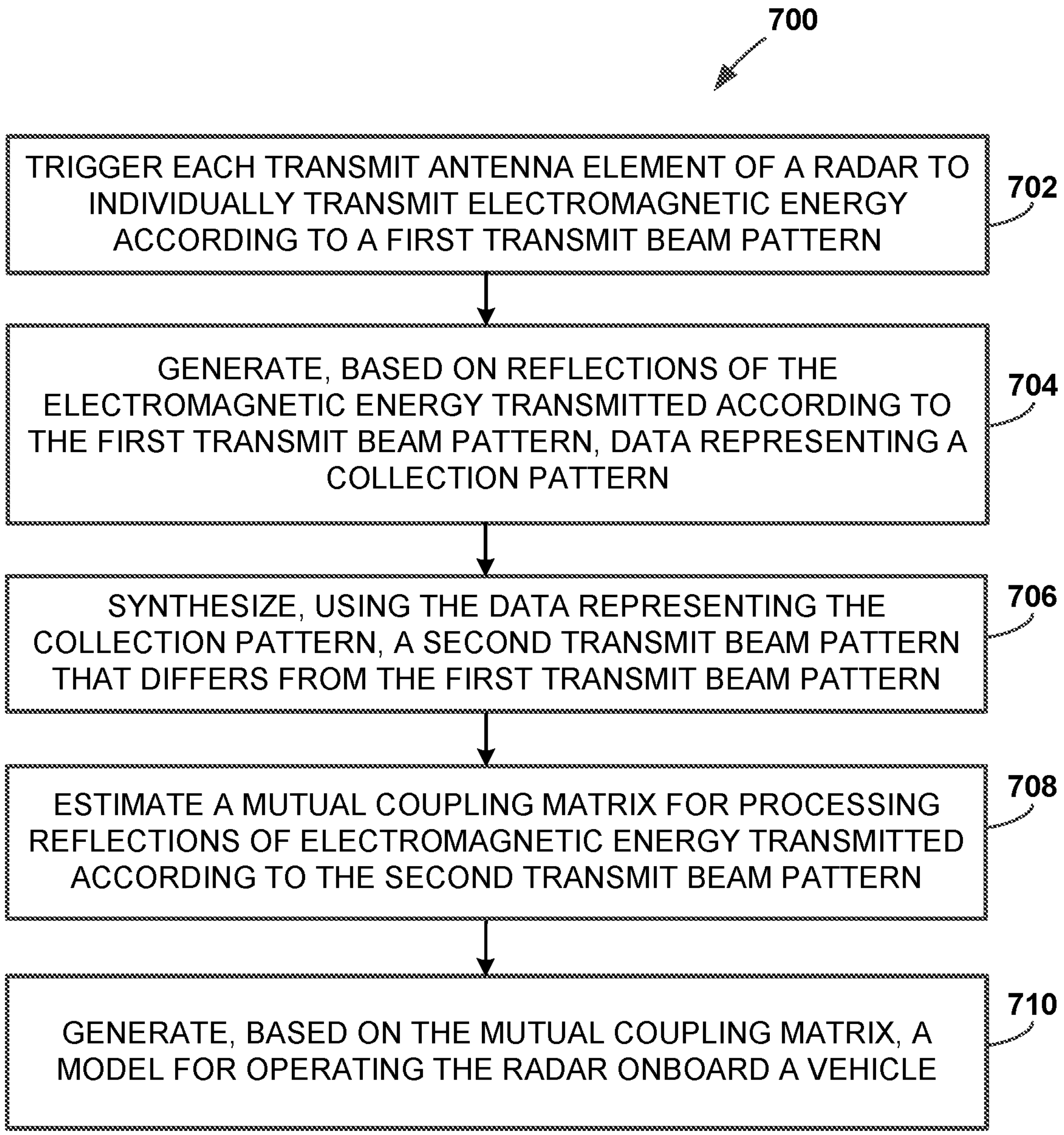
FIG. 7 is a flowchart of another method for radar calibration and testing, according to example embodiments.

FIG. 7 is a flowchart of another method for radar calibration. Method 700 may include one or more operations, functions, or actions as illustrated by one or more of block 702, 704, 706, and 708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

At block 702, method 700 involves triggering each transmit antenna element of a radar to individually transmit electromagnetic energy according to a first transmit beam pattern. The radar includes a plurality of transmit antenna elements. For instance, a computing system can trigger each transmit antenna element of the radar to individually transmit electromagnetic energy in a consecutive order. In addition, each transmit antenna element of the radar can be triggered to individually transmit electromagnetic energy across multiple azimuth angles.

As an example, the computing system can trigger a first transmit antenna element to transmit first electromagnetic energy at a first time and then trigger a second transmit antenna element to transmit second electromagnetic energy at a second time with the second time being subsequent to the first time. The computing system can then trigger a third transmit antenna element to transmit third electromagnetic energy at a third time with the third time being subsequent to the second time and so on. This enables the receive antenna array (and therefore the computing system) to collect emissions from each transmit antenna independently. As such, the computing system can generate data representing the collection pattern based on reflections corresponding to the first electromagnetic energy, the second electromagnetic energy, and the third electromagnetic energy.

At block 704, method 700 involves generating, by the computing system and based on reflections of the electromagnetic energy transmitted according to the first transmit beam pattern, data representing a collection pattern. The data representing the collection pattern can be generated such that the collection pattern is agnostic of lobe and null locations corresponding to the first transmit beam pattern.

At block 706, method 700 involves synthesizing, using the data representing the collection pattern, a second transmit beam pattern that differs from the first transmit beam pattern. The shape, direction, size, and/or other aspects of the beam pattern can differ. In some cases, the computing system can synthesize multiple transmit beam patterns that differ from the first transmit beam pattern. The various transmit beam patterns can be synthesized based on the data representing the single collection pattern.

At block 706, method 700 involves estimating a mutual coupling matrix for processing reflections of electromagnetic energy transmitted according to the second transmit beam pattern. For instance, the computing system can estimate the mutual coupling matrix based on a reference array response matrix. The reference array response matrix depends on the environment of the radar. The computing system may use different reference array response matrices based on triggering the radar in different calibration environments. The reference array response matrix can convey how a specific array of antennas responds to signals, which can be conveyed in terms of amplitude, phase, and other relevant parameters. The reference array response matrix can be determined as a function of the collection geometry and used to describe the phase front measured by each element due to turrets at points from the collection geometry. In some examples, the reference array response matrix is determined within a lab setting, such as during testing of a radar configuration. The reference array response matrix can be determined via simulations, transmission and reception data analysis, or a combination.

In some examples, the computing system uses a radar steering matrix as the reference array response matrix. The radar steering matrix is a mathematical representation that describes how a radar can steer its beam in different directions. The antenna array of the radar can be electronically or mechanically steered to focus the transmitted or received signals in a specific direction. The radar steering matrix is used to provide a way to understand and quantify the radar's steering capabilities. In addition, the radar steering matrix can convey the phase settings of each element in the array to the direction in which the radar beam is steered. The steering matrix allows the radar system to point the beam in a desired direction, track moving targets, and adapt to changing operational requirements. As such, the computing system can use the radar steering matrix as a reference array response matrix when estimating a mutual coupling matrix for processing reflections of electromagnetic energy transmitted according to different transmit beam patterns.

In some examples, the computing system estimates a transport delay corresponding to the second transmit beam pattern and performs, using the transport delay, waveform matching based on synthesizing the second transmit beam pattern. The computing system can then estimate the mutual coupling matrix further based on performing waveform matching. The estimation can factor the reference array response matrix.

In some examples, the computing system may perform a manifold matching process to model a freespace array response for a mainlobe of the second transmit beam pattern. The computing system may also determine a difference between the freespace array response and a synthesized array response for the mainlobe of the second transmit beam pattern and calculate a correction based on the difference. The computing system can then estimate the mutual coupling matrix based on the correction.

At block 708, method 700 involves generating, based on the mutual coupling matrix, a model for operating the radar onboard a vehicle. The model enables a vehicle radar system having one or more radars that match the radar to transmit and receive electromagnetic energy according to the first transmit beam pattern and the second transmit beam pattern. The second transmit beam pattern has a shape or a direction that differs from the first transmit beam pattern. In some cases, the computing system also performs a manifold matching process (waveform matching) and generates the model further based on an angle dependent term determined based on performing the manifold matching process.

In some examples, the computing system provides the model to one or more vehicles as an over-the-air update via wireless communication. The computing system can provide the data representing the collection pattern along with the model to the vehicle as part of the over-the-air update. The combination of the model and the data representing the collection pattern can enable each vehicle radar system to synthesize a plurality of transmit beam patterns and estimate mutual coupling matrices corresponding to the plurality of transmit beam patterns for use during navigation by the vehicle.

In some examples, method 700 involves receiving, from receive antenna elements of the radar, reflections of the electromagnetic energy transmitted according the first transmit beam pattern where the reflections of the electromagnetic energy transmitted according to the first transmit beam pattern reflect off a calibration target located in an environment of the radar prior to arriving at the receive antenna elements of the radar at a first plurality of angles. As such, the computing system may then estimate the mutual coupling matrix based on the reflections of electromagnetic energy transmitted according to the second transmit beam pattern arriving at the receive antenna elements of the radar at a second plurality of angles.

The computing system can similarly synthesize, based on the data representing the collection pattern, a third transmit beam pattern that differs from the first transmit beam pattern and the second transmit beam pattern and estimate a second mutual coupling matrix for processing reflections of electromagnetic energy transmitted according to the third transmit beam pattern. The computing system can estimate the second mutual coupling matrix based on the reflections of electromagnetic energy transmitted according to the third transmit beam pattern arriving at the receive antenna elements of the radar at a third plurality of angles that differ from the first plurality of angles and the second plurality of angles. The computing system may generate the model based on both the mutual coupling matrix (e.g., a first mutual coupling matrix) and the second mutual coupling matrix. The model can then enable the radar to transmit and receive electromagnetic energy according to the first transmit beam pattern, the second transmit beam pattern, and the third transmit beam pattern.

In some examples, method 700 also involves applying a range compression filter and a zero Doppler filter on the data representing the collection pattern, estimating transmit calibration parameters based on the data representing the collection pattern after applying the range compression filter and the zero Doppler filter, and calibrating a transmission phase shifter based on the transmit calibration parameters. The computing system can then estimate the mutual coupling matrix further based on the transmission phase shifter.

In some examples, the computing system may estimate a transport delay corresponding to the second transmit beam pattern and perform, using the transport delay, waveform matching to determine a difference between the second transmit beam pattern and a corresponding freespace beam pattern. The computing system may then estimate the mutual coupling matrix further based on the difference.

In some examples, vehicle radars can be used with control electronics, which can include one or more field-programmable gate arrays (FPGAs), ASICs, CPUs, GPUs, and/or TPUs. For instance, a radar unit can generate and receive complex signals that require significant processing. One or more control electronics can be programmed to implement various signal processing algorithms, such as filtering, modulation/demodulation, noise reduction, and digital beamforming. These operations help extract relevant information from the received radar signals, enhance signal quality, and improve target detection and tracking. In addition, radar systems often involve the conversion of analog signals to digital format for further processing. The control electronics can include analog-to-digital converters (ADCs) and digital-to-analog converters (DACs) to facilitate these conversions. The control electronics can receive analog signals from radar sensors, digitize them, and process the digital data for analysis and interpretation.

In addition, the control electronics can also provide the capability for real-time control and coordination of various radar system components. For instance, the control electronics can handle synchronization, timing generation, and system control, ensuring the proper timing and sequencing of operations within the radar system. This real-time control is crucial for accurate and synchronized signal transmission and reception. The control electronics can efficiently handle large amounts of data generated by the radar system. The control electronics can implement data storage, buffering, and data flow management techniques, enabling efficient data handling during signal transmission. This includes tasks such as data compression, data packetization, and data routing, ensuring smooth and reliable data transmission within the radar system. The control electronics can also integrate various interfaces and protocols required for radar signal transmission, such as processors, memory modules, communication modules, and display units. The control electronics can provide the necessary interface logic to facilitate seamless data exchange between these components, enabling efficient data flow and system integration. The control electronics can also be reconfigured and customized to meet specific radar system requirements and adapt to changing operational needs. This allows radar system designers to implement and optimize algorithms and functionalities specific to their application, resulting in enhanced performance and efficiency.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

triggering, by a computing system, each transmit antenna element of a radar to individually transmit electromagnetic energy according to a first transmit beam pattern;

generating, by the computing system and based on reflections of the electromagnetic energy transmitted according to the first transmit beam pattern, data representing a collection pattern that is agnostic of transmit beam lobe and null locations;

synthesizing, using the data representing the collection pattern, a plurality of additional transmit beam patterns that differ from the first transmit beam pattern;

estimating a plurality of mutual coupling matrices for processing reflections of electromagnetic energy transmitted according to the plurality of additional transmit beam patterns; and generating, by the computing system and based on the plurality of mutual coupling matrices, a model for operating the radar onboard a vehicle, wherein the model enables a vehicle radar system to transmit and receive electromagnetic energy according to the plurality of additional transmit beam patterns and to synthesize additional transmit beam patterns and estimate corresponding mutual coupling matrices for use during navigation by the vehicle.

2. The method of claim 1, wherein estimating the plurality of mutual coupling matrices comprises:

estimating a mutual coupling matrix of the plurality of mutual coupling matrices based on a reference array response matrix, wherein the reference array response matrix depends on an environment of the radar.

3. The method of claim 1, further comprising:

receiving, from receive antenna elements of the radar, reflections of the electromagnetic energy transmitted according the first transmit beam pattern, wherein the reflections of the electromagnetic energy transmitted according the first transmit beam pattern reflect off a calibration target located in an environment of the radar prior to arriving at the receive antenna elements of the radar at a first plurality of angles.

4. The method of claim 3, wherein estimating a mutual coupling matrix of the plurality of mutual coupling matrices for processing reflections of electromagnetic energy transmitted according to a second transmit beam pattern of the plurality of additional transmit beam patterns comprises:

estimating the mutual coupling matrix based on the reflections of electromagnetic energy transmitted according to the second transmit beam pattern arriving at the receive antenna elements of the radar at a second plurality of angles.

5. The method of claim 4, further comprising:

synthesizing, based on the data representing the collection pattern, a third transmit beam pattern that differs from the first transmit beam pattern and the second transmit beam pattern; and estimating a second mutual coupling matrix for processing reflections of electromagnetic energy transmitted according to the third transmit beam pattern.

6. The method of claim 5, wherein estimating the second mutual coupling matrix for processing reflections of electromagnetic energy transmitted according to the third transmit beam pattern comprises:

estimating the second mutual coupling matrix based on the reflections of electromagnetic energy transmitted according to the third transmit beam pattern arriving at the receive antenna elements of the radar at a third plurality of angles, wherein the third plurality of angles differ from the first plurality of angles and the second plurality of angles.

7. The method of claim 6, wherein generating the model for operating the radar onboard the vehicle comprises:

generating the model based on both a first mutual coupling matrix of the plurality of mutual coupling matrices and the second mutual coupling matrix, wherein the model enables the radar to transmit and receive electromagnetic energy according to the first transmit beam pattern, the second transmit beam pattern, and the third transmit beam pattern.

8. The method of claim 1, further comprising:

providing the model to the vehicle as an over-the-air update via wireless communication.

9. The method of claim 8, further comprising:

providing the data representing the collection pattern along with the model to the vehicle as part of the over-the-air update, wherein the combination of the model and the data representing the collection pattern enables each vehicle radar system to synthesize a plurality of transmit beam patterns and estimate mutual coupling matrices corresponding to the plurality of transmit beam patterns for use during navigation by the vehicle.

10. The method of claim 1, further comprising:

performing a manifold matching process to model a freespace array response for a mainlobe of a second transmit beam pattern of the plurality of additional transmit beam patterns;

determining a difference between the freespace array response and a synthesized array response for the mainlobe of the second transmit beam pattern;

calculating a correction based on the difference; and wherein estimating the plurality of mutual coupling matrices comprises:

estimating a mutual coupling matrix of the plurality of mutual coupling matrices based on the correction.

11. The method of claim 1, wherein triggering each transmit antenna element of the radar to individually transmit electromagnetic energy comprises:

triggering a first transmit antenna element to transmit first electromagnetic energy at a first time;

triggering a second transmit antenna element to transmit second electromagnetic energy at a second time, wherein the second time is subsequent to the first time; and triggering a third transmit antenna element to transmit third electromagnetic energy at a third time, wherein the third time is subsequent to the second time.

12. The method of claim 11, wherein triggering each transmit antenna element of the radar to individually transmit electromagnetic energy comprises:

triggering each transmit antenna element of the radar to individually transmit electromagnetic energy across a plurality of azimuth angles, wherein the plurality of azimuth angles depend on the first transmit beam pattern.

13. The method of claim 1, further comprising:

applying a range compression filter and a zero Doppler filter on the data representing the collection pattern;

estimating transmit calibration parameters based on the data representing the collection pattern after applying the range compression filter and the zero Doppler filter; and calibrating a transmission phase shifter based on the transmit calibration parameters.

14. The method of claim 13, wherein estimating the plurality of mutual coupling matrices comprises:

estimating a mutual coupling matrix of the plurality of mutual coupling matrices further based on the transmission phase shifter.

15. A system comprising:

a radar; and a computing system, the computing system configured to:

trigger each transmit antenna element of the radar to individually transmit electromagnetic energy according to a first transmit beam pattern;

generate, based on reflections of the electromagnetic energy transmitted according to the first transmit beam pattern, data representing a collection pattern that is agnostic of transmit beam lobe and null locations;

synthesize, using the data representing the collection pattern, a plurality of additional transmit beam patterns that differ from the first transmit beam pattern;

estimate a plurality of mutual coupling matrices for processing reflections of electromagnetic energy transmitted according to the plurality of additional transmit beam patterns; and generate, based on the plurality of mutual coupling matrices, a model for operating the radar onboard a vehicle, wherein the model enables a vehicle radar system to transmit and receive electromagnetic energy according to the plurality of additional transmit beam patterns and to synthesize additional transmit beam patterns and estimate corresponding mutual coupling matrices for use during navigation by the vehicle.

16. The system of claim 15, wherein the computing system is further configured to:

estimate a transport delay corresponding to a second transmit beam pattern of the plurality of additional transmit beam patterns; and perform, using the transport delay, waveform matching to determine a difference between the second transmit beam pattern and a corresponding freespace beam pattern.

17. The system of claim 16, wherein the computing system is further configured to:

estimate a mutual coupling matrix of the plurality of mutual coupling matrices further based on the difference.

18. The system of claim 15, wherein the computing system is further configured to:

synthesize, using the data representing the collection pattern, a third transmit beam pattern that differs from the first transmit beam pattern and a second transmit beam pattern of the plurality of additional transmit beam patterns; and estimate a second mutual coupling matrix for processing reflections of electromagnetic energy transmitted according to the third transmit beam pattern.

19. A non-transitory computer-readable medium configured to store instructions, that when executed by a computing system comprising one or more processors, causes the computing system to perform operations comprising:

triggering each transmit antenna element of a radar to individually transmit electromagnetic energy according to a first transmit beam pattern;

generating, based on reflections of the electromagnetic energy transmitted according to the first transmit beam pattern, data representing a collection pattern that is agnostic of transmit beam lobe and null locations;

synthesizing, using the data representing the collection pattern, a plurality of additional transmit beam patterns that differ from the first transmit beam pattern;

estimating a plurality of mutual coupling matrices for processing reflections of electromagnetic energy transmitted according to the plurality of additional transmit beam patterns; and generating, based on the plurality of mutual coupling matrices, a model for operating the radar onboard a vehicle, wherein the model enables a vehicle radar system to transmit and receive electromagnetic energy according to the plurality of additional transmit beam patterns and to synthesize additional transmit beam patterns and estimate corresponding mutual coupling matrices for use during navigation by the vehicle.

20. The system of claim 15, wherein the computing system is further configured to:

perform a manifold matching process to model a freespace array response for a mainlobe of a second transmit beam pattern of the plurality of additional transmit beam patterns;

determine a difference between the freespace array response and a synthesized array response for the mainlobe of the second transmit beam pattern;

calculate a correction based on the difference; and wherein estimating the plurality of mutual coupling matrices comprises estimating a mutual coupling matrix of the plurality of mutual coupling matrices based on the correction.

* * * * *